US012447600B2

(12) United States Patent
Kotsuji et al.

(10) Patent No.: US 12,447,600 B2
(45) Date of Patent: Oct. 21, 2025

(54) POWER TOOL

(71) Applicant: MAKITA CORPORATION, Anjo (JP)

(72) Inventors: Takafumi Kotsuji, Anjo (JP); Shin Nakamura, Anjo (JP); Akira Mizutani, Anjo (JP); Masatoshi Nakahama, Anjo (JP); Yoshihiro Ozeki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/388,244

(22) Filed: Nov. 9, 2023

(65) Prior Publication Data

US 2024/0066678 A1 Feb. 29, 2024

Related U.S. Application Data

(63) Continuation of application No. 17/513,553, filed on Oct. 28, 2021, now Pat. No. 11,850,720.

(30) Foreign Application Priority Data

Oct. 29, 2020 (JP) .................................. 2020-181168
Oct. 29, 2020 (JP) .................................. 2020-181169
Oct. 29, 2020 (JP) .................................. 2020-181171

(51) Int. Cl.
*B25F 5/00* (2006.01)
(52) U.S. Cl.
CPC .................................... *B25F 5/006* (2013.01)
(58) Field of Classification Search
CPC ..................................................... B25F 5/006
See application file for complete search history.

(56) References Cited

U.S. PATENT DOCUMENTS

| 10,661,426 | B2 * | 5/2020 | Aoki | ....................... B25F 5/006 |
|---|---|---|---|---|
| 2017/0239803 | A1 | 8/2017 | Aoki | |
| 2019/0168371 | A1 | 6/2019 | Aoki | |
| 2019/0168372 | A1 | 6/2019 | Aoki | |
| 2020/0282539 | A1 | 9/2020 | Ikuta et al. | |

FOREIGN PATENT DOCUMENTS

JP 2017-144539 A 8/2017

OTHER PUBLICATIONS

Feb. 18, 2025 Office Action issued in Chinese Patent Application No. 202111263094.8.

* cited by examiner

*Primary Examiner* — Daniel Jeremy Leeds
(74) *Attorney, Agent, or Firm* — Oliff PLC

(57) ABSTRACT

A power tool includes a motor, a spindle, an inner housing, an outer housing formed by an upper member and a lower member, a pair of interposing members and a pair of elastic members. The interposing members are arranged leftward and rightward of the inner housing, respectively, and fixedly connected to a first member, which is one of the upper member and the lower member, and at least partially in contact with an inner surface of the first member. The elastic members are held between a left portion of the inner housing and one of the interposing members and between a right portion of the inner housing and the other of the interposing members, respectively. A first end portion of each of the interposing members has at least one first surface extending to be closer to the inner housing toward a tip end of the first end portion.

18 Claims, 14 Drawing Sheets

POWER TOOL

CROSS-REFERENCE TO RELATED APPLICATIONS

This is a Continuation Application of U.S. patent application Ser. No. 17/513,553, filed Oct. 28, 2021, which claims priority to Japanese Patent Application Nos. 2020-181168, 2020-181169, and 2020-181171, all three of which were filed on Oct. 29, 2020. The contents of the foregoing applications are hereby fully incorporated herein by reference.

TECHNICAL FIELD

The present disclosure relates to a power tool that is configured to drive a tool accessory in an oscillating manner.

BACKGROUND

Power tools that are known as so-called oscillating tools or multi-tools are configured to perform a processing operation on a workpiece by driving a tool accessory that is mounted to (on) a spindle in an oscillating manner within a specified angle range. Vibration is generated in (on) the oscillating tool while the tool accessory is driven in an oscillating manner. Thus, in order to reduce the vibration to be transmitted to a grip part, some of the known oscillating tools have a vibration-isolating structure. For example, Japanese laid-open patent publication No. 2017-144539 discloses an oscillating tool having an outer housing and an inner housing connected via elastic members.

SUMMARY

Technical Problem

The outer housing of the above-described oscillating tool is formed by connecting two components, which are originally divided, in an up-down direction. Two elastic members are respectively disposed leftward and rightward of the inner housing. The elastic members are supported between the inner housing and an interposing member. The interposing member is connected (coupled) to the outer housing in the up-down direction, such that the elastic member are compressed between the inner housing and an interposing member in the left-right direction. However, improvement in such a support structure of the elastic members is possible, in order to facilitate assembling.

Accordingly, one, non-limiting object of the present disclosure is to provide improvement in a support structure of an elastic member in a power tool having a vibration-isolating structure.

In one aspect of the present disclosure, a power tool includes a motor, a spindle, an inner housing, an outer housing, a pair of (two) interposing members and a pair of (two) elastic members.

The spindle is configured to drive a tool accessory that is removably mounted (coupled) to (on) the spindle in an oscillating manner around a first axis, using power generated by the motor. The first axis defines an up-down direction of the power tool. The inner housing houses at least the motor and the spindle. The outer housing houses the inner housing. The outer housing extends along a second axis. The second axis is orthogonal to the first axis and defines a front-rear direction of the power tool. The outer housing is formed by an upper member and a lower member that are connected (coupled) to each other in the up-down direction. The upper member and the lower member are discrete (separate, different) members.

The pair of (two) interposing members are arranged leftward and rightward of the inner housing, respectively, and fixedly connected (coupled) to a first member, which is one of the upper member and the lower member, such that the interposing members are at least partially in contact with (at least partially abut on) an inner surface of the first member. One of the pair of (two) elastic members is held between a left portion of the inner housing and one of the interposing members, and the other of the elastic members is held between a right portion of the inner housing and the other of the interposing members, such that the elastic members are compressed in a left-right direction, which is orthogonal to the up-down direction and the front-rear direction. A first end portion of each of the interposing members has at least one first surface. The first end portion is one of an upper end portion and a lower end portion of each of the interposing members to be inserted into the first member first (i.e., to be inserted before the other of the upper end portion and the lower end portion). To put it differently, the first end portion is one of an upper end portion and a lower end portion of each of the interposing members that is farther from a second member, which is the other of the upper member and the lower member. The at least one first surface extends to be closer to the inner housing toward a tip end of the first end portion.

The power tool of this aspect is a so-called oscillating tool that is configured to drive the tool accessory in an oscillating manner around the first axis that extends in the up-down direction. In the oscillating tool, major vibration is generated in the left-right direction. In order to effectively reduce transmission of the vibration in the left-right direction from the inner housing to the outer housing, the two elastic members need to be held in a compressed state in the left-right direction, between the left portion of the inner housing and the outer housing and between the right portion of the inner housing and the outer housing, respectively. In this aspect, the outer housing is formed by the upper member and the lower member that are connected with (coupled to) each other in the up-down direction. By employing (utilizing) the two interposing members, assembling of the power tool can be facilitated as follows.

An assembler (a person who assembles the power tool) can insert the inner housing, the two interposing members and the two elastic members into the first member, in a state in which the two elastic members are respectively disposed between the inner housing and the corresponding two interposing members. At the time of insertion, the first end portion of each of the interposing members enters the first member first (i.e., ahead of the second end portion). The at least one first surface formed on the first end portion extends to be closer to the inner housing toward the tip end of the first end portion. Thus, this structure (design) can reduce the possibility (likelihood) that the interposing member interferes with an opening edge of the first member at the start of inserting the interposing member into the first member. Further, the two interposing members can at least partially come into contact with the inner surface of the first member in response to the insertion of the interposing members to thereby compress the elastic members in the left-right direction. Consequently, according to this aspect, by utilizing the two interposing members, the assembler can easily place the left and right elastic members in a compressed state between the inner housing and the outer housing that is formed by the upper member and the lower member connected together in the up-down direction.

DETAILED DESCRIPTION OF THE EMBODIMENTS

Figure 1:
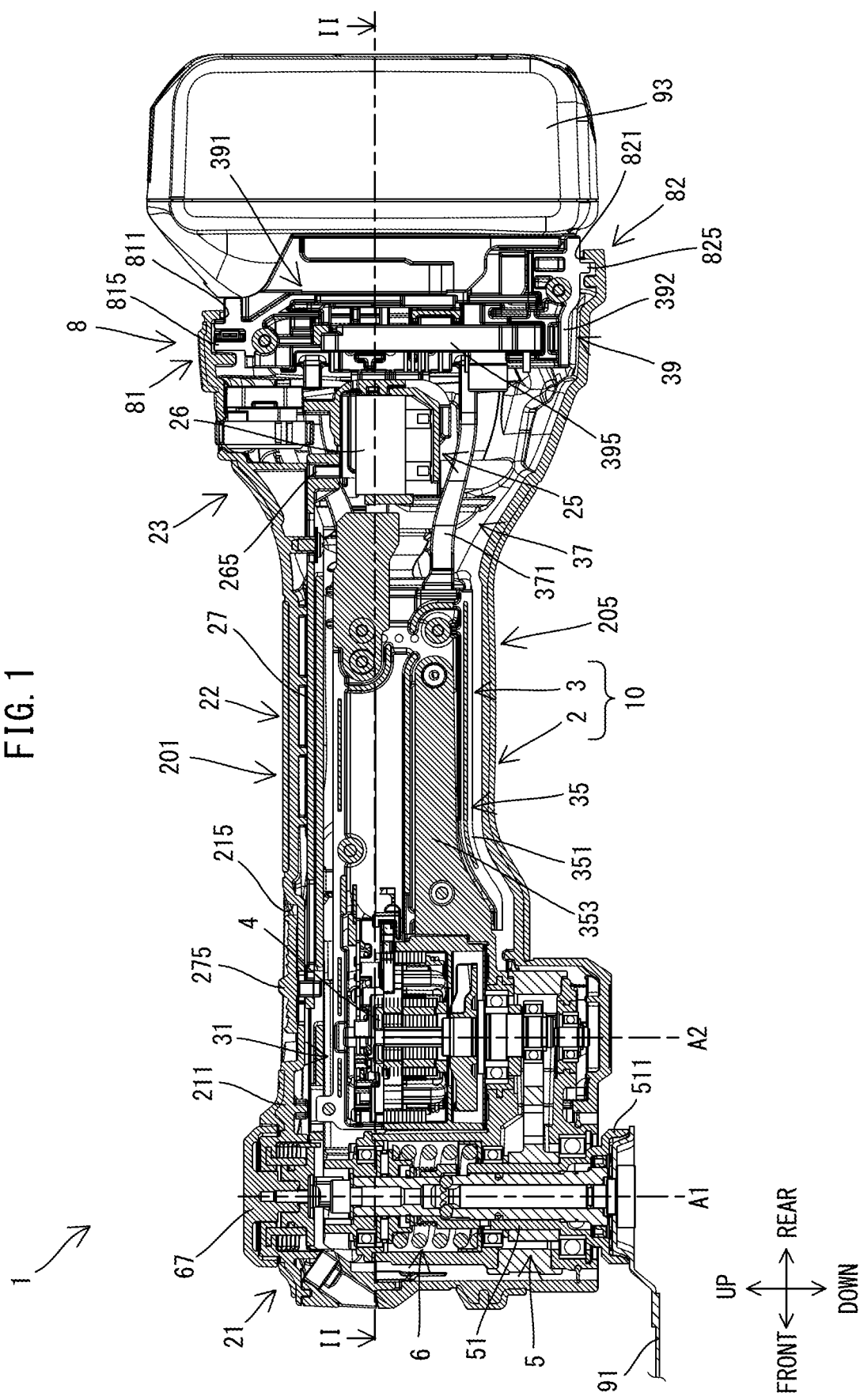
FIG. 1 is a sectional view of an oscillating tool according to one embodiment of the present disclosure.

In one, non-limiting embodiment of the present disclosure, the interposing members may be respectively configured to engage with the elastic members mounted on the inner housing such that the interposing members are held by elastic force of the elastic members. According to this embodiment, the assembler can engage the interposing members with the elastic members, respectively, during the assembling operation. Thus, the assembling can be further facilitated.

In addition or in the alternative to the preceding embodiment of the present disclosure, the at least one first surface may include at least one inclined surface (oblique surface) that is inclined (that extends obliquely) to be closer to the inner housing toward the tip end of the first end portion. According to this embodiment, the assembling can be facilitated by the first surface having a simple structure.

In addition or in the alternative to the preceding embodiments of the present disclosure, the at least one inclined surface (oblique surface) may include multiple inclined surfaces (oblique surfaces) having angles of inclination that are different from each other. In this embodiment, each of the interposing members can be more smoothly inserted into the first member.

In addition or in the alternative to the preceding embodiments of the present disclosure, each of the interposing members may have a tubular part extending in the up-down direction. Each of the interposing members may be connected with (coupled to) the upper member and the lower member using a screw, which is inserted through the tubular part. According to this embodiment, each of the interposing members can be effectively connected (coupled) to the upper member and the lower member using the screw while each of the interposing members is positioned relative to the upper member and the lower member using the tubular part.

In addition or in the alternative to the preceding embodiments of the present disclosure, the at least one first surface may include a pair of (two) first surfaces that are respectively disposed frontward and rearward of the tubular part. According to this embodiment, each of the interposing members can be stably inserted into the first member, owing to the two first surfaces.

In addition or in the alternative to the preceding embodiments of the present disclosure, each of the interposing members may have at least one second surface that abuts on the inner surface of the first member. The at least one second surface may be different from the at least one first surface. According to this embodiment, by securing dimensional accuracy of the at least one second surface of each of the interposing members, the elastic member can be appropriately supported. Accordingly, dimensional management can be made easier, which facilitates manufacturing of the interposing members.

In addition or in the alternative to the preceding embodiments of the present disclosure, a rotational axis of an output shaft of the motor may extend in parallel to the first axis of the spindle. Each of the elastic members may be arranged at least partially between the first axis and the rotational axis of the output shaft of the motor in the front-rear direction. According to this embodiment, the motor and the spindle can be arranged relatively close to each other. Thus, the power tool can be downsized. Further, the two elastic members can effectively reduce the transmission of the vibration from the inner housing to the outer housing in the vicinity of the motor and the spindle, which are major sources of the vibration.

An oscillating tool 1 according to a non-limiting, representative embodiment of the present disclosure is now described in detail with reference to the drawings. The oscillating tool 1 is an example of a power tool that is configured to perform a processing operation on a workpiece (not shown) by driving a tool accessory 91 in an oscillating manner.

Figure 2:
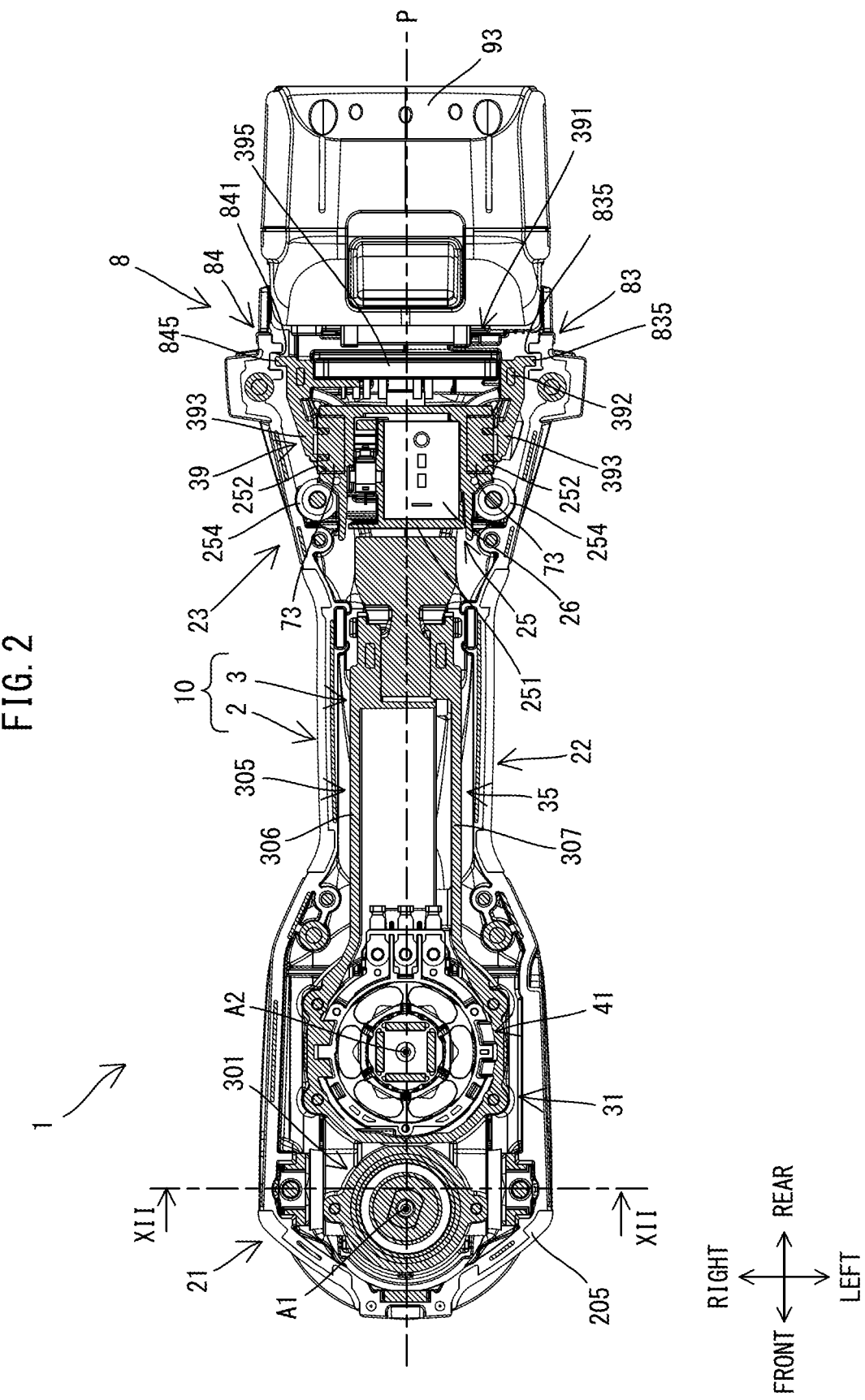
FIG. 2 is a sectional view taken along line II-II in FIG. 1.

First, the general structure of the oscillating tool 1 is briefly described. As shown in FIGS. 1 and 2, the oscillating tool 1 has an elongate housing (also referred to as a tool body) 10. A driving mechanism 5 including a spindle 51, and a motor 4 are housed in one end portion of the housing 10 in its longitudinal direction. The spindle 51 is arranged such that a longitudinal axis of the spindle 51 (a driving axis A1 of the tool accessory 91) is substantially orthogonal to a longitudinal axis of the housing 10. One axial end portion of the spindle 51 protrudes from the housing 10 and is exposed outside of the housing 10. This end portion defines a tool mounting part 511, to (on) which the tool accessory 91 is removably mountable. Further, a battery mounting part 391, to which a battery 93 is removably mountable, is disposed in the other end portion of the housing 10 in its longitudinal direction. The oscillating tool 1 operates using electric power supplied from the battery 93. The driving mechanism 5 is configured to oscillate the tool accessory 91 mounted to (on) the tool mounting part 511 about the driving axis A1 within a specified angle range, using power generated by the motor 4.

The structure of the oscillating tool 1 is now described in detail. For the sake of convenience in the following description, an extension direction of the driving axis A1 is defined as an up-down direction of the oscillating tool 1. In the up-down direction, the side on which the tool mounting part 511 of the spindle 51 is located is defined as a lower side of the oscillating tool 1, while the opposite side is defined as an upper side of the oscillating tool 1. A direction that is orthogonal to the driving axis A1 and that substantially corresponds to the longitudinal direction of the housing 10 is defined as a front-rear direction of the oscillating tool 1. In the front-rear direction, the side of the one end portion of the housing 10 in which the spindle 51 is housed is defined as a front side of the oscillating tool 1, while the side of the other end portion to (on) which the battery 93 is mountable is defined as a rear side of the oscillating tool 1. Further, a direction that is orthogonal to both the up-down direction and the front-rear direction is defined as a left-right direction.

First, the structure of the housing 10 is described. As shown in FIGS. 1 and 2, the housing 10 of this embodiment is configured as a so-called vibration-isolating housing. Specifically, the housing 10 includes an elongate outer housing 2, which forms (defines) an outer shell of the oscillating tool 1, and an elongate inner housing 3, which is housed in the outer housing 2. The outer housing 2 and the inner housing 3 are elastically connected with (coupled to) each other such that the outer housing 2 and the inner housing 3 are movable relative to each other.

In relation to the front-rear direction, the outer housing 2 includes a front part 21, a rear part 23 and a central part 22 that connects the front part 21 and the rear part 23.

The front part 21 has a generally rectangular box-like shape. A front part 31 of the inner housing 3 is disposed in the front part 21. A lever 67 is rotatably (pivotably) supported by (at) an upper front end portion of the front part 21. In this embodiment, the lever 67 is arranged directly above the spindle 51 and is rotatable (pivotable) around the driving axis A1. The lever 67 is a manually operable member for clamping the tool accessory 91 and for releasing the tool accessory 91 via a clamping mechanism 6, as will be described later. An opening 215 is formed in a rear portion of an upper wall 211 of the front part 21. A slidable operation (manipulation) part 275 is exposed to the outside through the opening 215, so that a user can manipulate (slide) the operation part 275 outside the outer housing 2. The operation part 275 is a manually operable member for switching ON and OFF a switch unit 26 for activating (actuating) the motor 4.

The rear part 23 has a tubular shape having a sectional area increasing toward the rear. An elastic connection part 37 and a rear part 39 of the inner housing 3 are disposed within the rear part 23.

The central part 22 has a tubular shape and linearly extends in the front-rear direction. The central part 22 is configured to be held by the user. Therefore, the central part 22 is also referred to as a grip part 22. The grip part 22 is narrower (i.e. has a smaller diameter or cross-section) than the front part 21 and the rear part 23 so as to be easy to hold (grasp) with one hand. In other words, the outer circumferential (peripheral) length of a section of the grip part 22 is shorter (less) than the outer circumferential (peripheral) length of each of the front part 21 and the rear part 23.

In this embodiment, the outer housing 2 is formed by an upper shell (upper housing half) 201 and a lower shell (lower housing half) 205 that are formed discretely (separately, individually) from each other and connected (coupled) together. More specifically, the outer housing 2 is formed by fitting (mating) the upper shell 201 and the lower shell 205 together in the up-down direction and connecting them by screws at multiple positions. Each of the upper shell 201 and the lower shell 205 is formed of synthetic resin (plastic, polymer).

Figure 3:
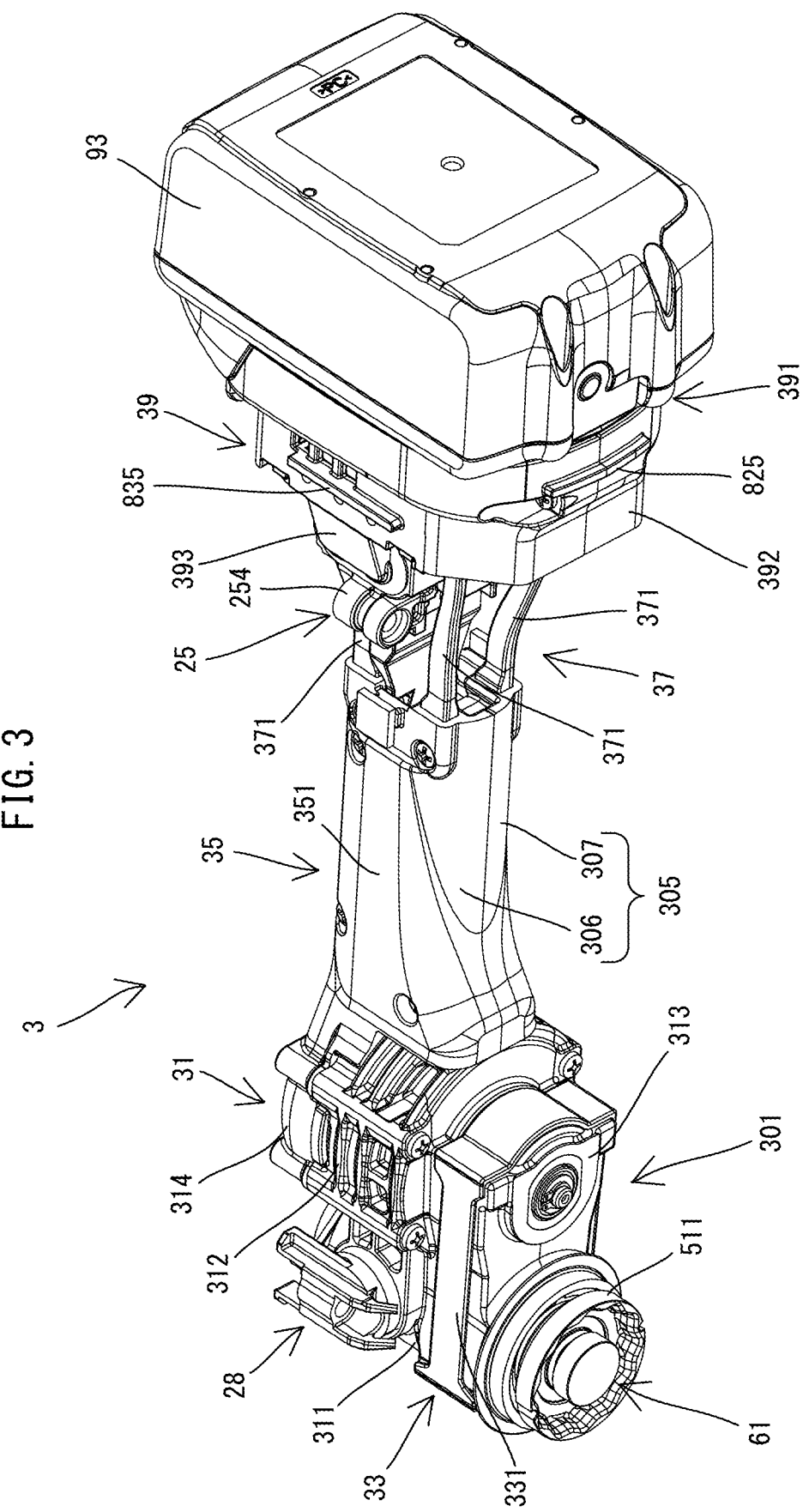
FIG. 3 is a perspective view of an inner housing.

As shown in FIGS. 1 to 3, in relation to the front-rear direction, the inner housing 3 includes the front part 31, an extending part 35, the elastic connection part 37 and the rear part 39.

Figure 4:
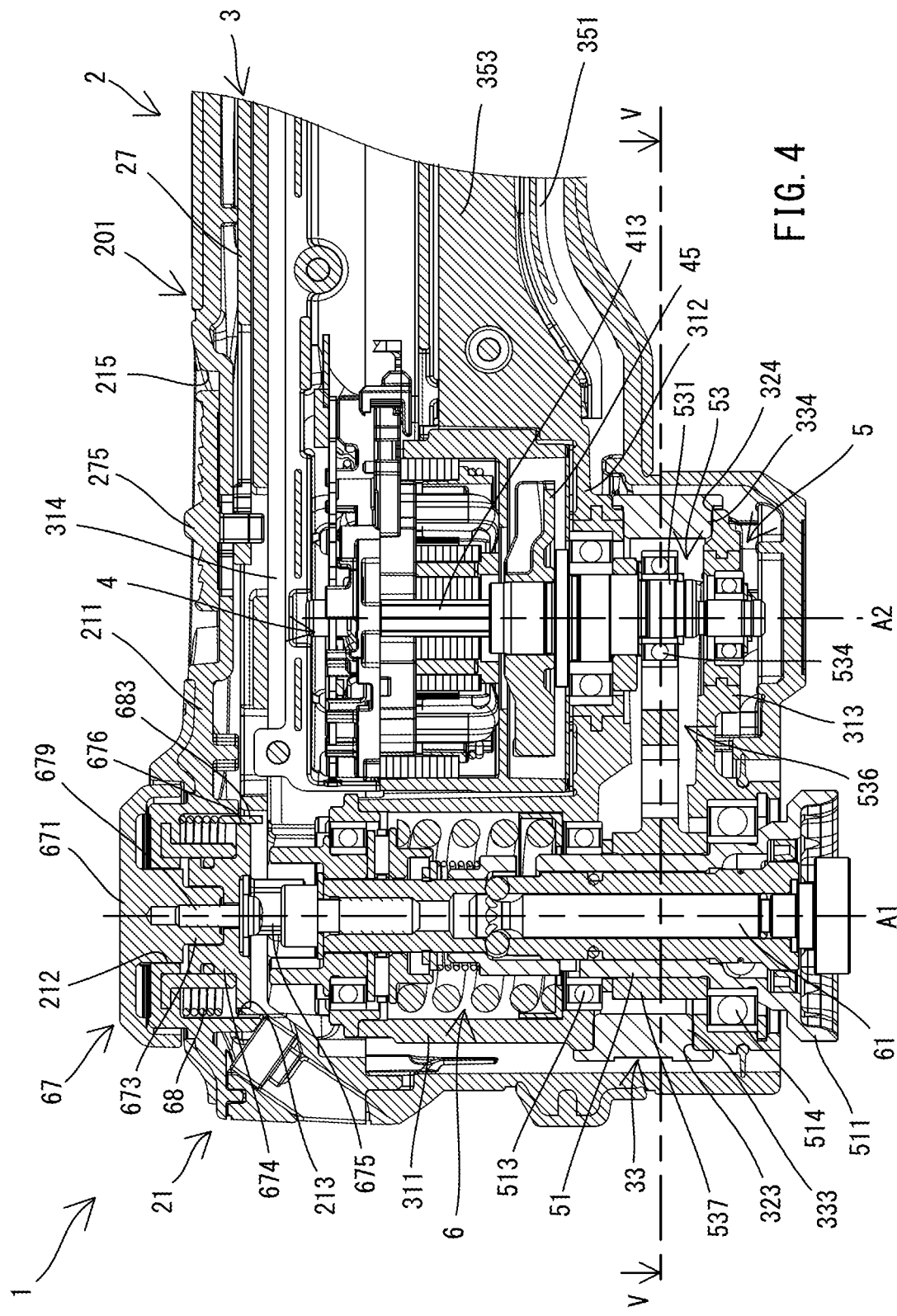
FIG. 4 is a partial, enlarged view of FIG. 1, wherein a tool accessory is not shown.

The front part 31 houses the driving mechanism 5 and the motor 4. More specifically, as shown in FIGS. 3 and 4, the front part 31 includes a first housing part 311, a second housing part 312, a third housing part 313 and a cover part 314.

The first housing part 311 houses the spindle 51 and a portion of an oscillating member 536, which will be described later, of the driving mechanism 5, and the clamping mechanism 6. The first housing part 311 has a generally circular hollow cylindrical shape and extends in the up-down direction. The second housing part 312 houses the motor 41. The second housing part 312 has a generally circular hollow cylindrical shape having a larger diameter than the first housing part 311. The second housing part 312 is disposed behind the first housing part 311. Further, the second housing part 312 is shorter than the first housing part 311 in the up-down direction. A lower end of the second housing part 312 is located above a lower end of the first housing part 311. The third housing part 313 houses a transmitting mechanism 53 of the driving mechanism 5. The third housing part 313 is disposed behind the first housing part 311 and under the second housing part 312. The third housing part 313 communicates with the first housing part 311 and the second housing part 312. The cover part 314 covers an open top of the second housing part 312.

As shown in FIGS. 1 to 3, the extending part 35 extends rearward from a rear end of the front part 31. The extending part 35 corresponds to at least a portion of the grip part 22 of the outer housing 2. The description of "the extending part 35 corresponds to at least a portion of the grip part 22" may be substituted with "a portion or an entirety of the extending part 35 is housed in at least a portion of the grip part 22". In this embodiment, the length of the extending part 35 in the front-rear direction is approximately equal to the length of the grip part 22 in the front-rear direction. The extending part 35 is thus generally entirely disposed within the grip part 22.

The extending part 35 includes an outer extending part 351 that forms (defines) an outer shell of the extending part 35, and an inner extending part 353 that is disposed within the outer extending part 351. The outer extending part 351 has a generally rectangular tubular shape and extends rearward from a rear end portion of the front end part 31 (more specifically, of the second housing part 312). The inner extending part 353 extends rearward within the outer extending part 351 from the rear end portion of the front end part 31 (more specifically, of the second housing part 312) to the rear end portion of the outer extending part 351. In this embodiment, the inner extending part 353 has a rectangular plate-like shape and extends linearly on (in) an imaginary plane P that passes the center of the oscillating tool 1 in the left-right direction. The plane P is also a plane that contains the driving axis A1 and a rotational axis A2 of an output shaft 413 of the motor 4 (see FIG. 12).

The elastic connection part 37 extends rearward from the rear end of the extending part 35 and connects the extending part 35 and the rear part 39 such that the extending part 35 and the rear part 39 are movable relative to each other. More specifically, the elastic connection part 37 includes a plurality of elastic members 371 that connect the outer extending part 351 and the rear part 39 in the front-rear direction. In this embodiment, four such elastic members 371 are arranged spaced apart from each other around the longitudinal axis of the inner housing 3. The elastic members 371 are shaped to be easily deformable, compared to the other portions of the inner housing 3. More specifically, each of the elastic members 371 is formed in an easily-deformable (bendable, flexible) band (strip) shape. Further, each of the elastic members 371 is formed of a material having a lower elastic modulus than the other portions of the inner housing 3. The elastic members 371 can thus effectively reduce (attenuate) transmission of vibration from the front part 31 to the rear part 39.

The rear part 39 has a generally rectangular box-like shape. The rear part 39 is disposed within the rear part 23 of the outer housing 2.

As shown in FIGS. 1 to 3, the inner housing 3 is formed by a metal housing 301 and a plastic housing 305 that are formed separately (discretely, individually) from each other and are connected together.

The metal housing 301 is a single (integral) metal member. A front portion of the metal housing 301 is configured as a housing part for the driving mechanism 5 and the motor 4, and includes the first housing part 311, the second housing part 312 and the third housing part 313 that are described above. A rear portion of the metal housing 301 is formed by the inner extending part 353. Thus, the metal housing 301 forms (defines) a portion of the front part 31 and a portion of the extending part 35.

The plastic housing 305 is formed by a right shell (right housing half) 306 and a left shell (left housing half) 307 that are formed separately (discretely, individually) from each other and connected together in the left-right direction. The right shell 306 and the left shell 307 are each formed of synthetic resin (plastic, polymer). The plastic housing 305 includes the cover part 314, the outer extending part 351, the elastic connection part 37 and the rear part 39 that are described above. Thus, the plastic housing 305 forms (defines) a portion of the front part 31, a portion of the extending part 35, the elastic connection part 37 and the rear part 39.

The inner housing 3 is formed by fixedly connecting the metal housing 301, the right shell 306 and the left shell 307 by screws, in a state in which the inner extending part 353 of the metal housing 301 is held between the right shell 306 and the left shell 307 (specifically, portions of the right shell 306 and the left shell 307 forming the outer extending part 351) from the right and left.

The structure that elastically connects the outer housing 2 and the inner housing 3 will be described in detail below.

The structures (elements) disposed within the inner housing 3 are now described.

First, the structures (elements) disposed within the front part 31 are described. As shown in FIG. 4, the front part 31 mainly houses the motor 4, the driving mechanism 5 and the clamping mechanism 6.

The motor 4 is a brushless DC motor. The motor 4 has a stator, a rotor disposed radially inward of the stator, and an output shaft (rotary shaft) 413 that is configured to rotate together with the rotor. The motor 4 is housed in the second housing part 312 such that the rotational axis A2 of the output shaft 413 extends in parallel to the driving axis A1 (i.e. in the up-down direction) directly behind the driving axis A1. The output shaft 413 protrudes downward of the stator. A fan 45 for cooling the motor 4 is fixed around the output shaft 413.

As shown in FIG. 4, the driving mechanism 5 mainly includes the spindle 51 and the transmitting mechanism 53.

The spindle 51 is an elongate member having a generally hollow circular cylindrical shape. In this embodiment, the spindle 51 is housed in a lower portion of the first housing part 311. The spindle 51 is supported by two bearings 513, 514 to be rotatable (pivotable) around the driving axis A1. The bearings 513, 514 are ball bearings and held in the first housing part 311. As described above, the lower end portion of the spindle 51 is configured as the tool mounting part 511, to (on) which the tool accessory 91 (see FIG. 1) is removably mountable.

The transmitting mechanism 53 is a known mechanism configured to convert power of the motor 4 (rotary motion of the output shaft 413) into rotary (pivotal) oscillating motion of the spindle 51 within a specified angle range around the driving axis A1. The transmitting mechanism 53 includes an eccentric shaft 531, a drive bearing 534, and an oscillating member 536.

The eccentric shaft 531 is coaxially connected to the output shaft 413 of the motor 4. The eccentric shaft 531 is rotatably supported by bearings, which are respectively held in a lower end portion of the second housing part 312 and in a lower end portion of the third housing part 313. The eccentric shaft 531 has an eccentric part (cam) that is eccentric to the rotational axis A2. An inner ring of the drive bearing 534 is fixed around the eccentric part.

Figure 5:
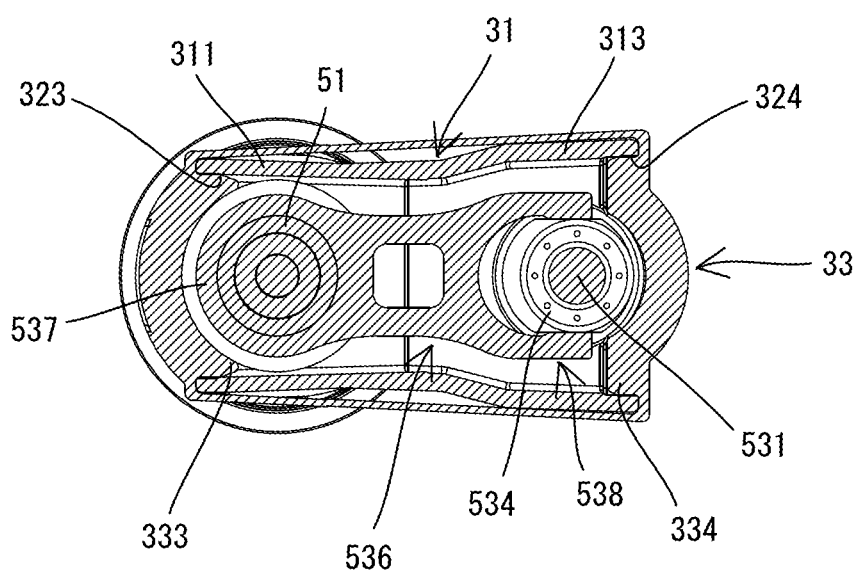
FIG. 5 is a sectional view taken along line V-V in FIG. 4, wherein an outer hosing is not shown.

As shown in FIGS. 4 and 5, the oscillating member 536 is operably connects (couples) the drive bearing 534 and the spindle 51. The oscillating member 536 extends across the first housing part 311 and the third housing part 313. The oscillating member 536 has an annular-shaped first end portion 537 and a bifurcated (forked) second end portion 538. The first end portion 537 is fixed around an outer periphery of the spindle 51 between the two bearings 513, 514 that support the spindle 51. The two ends of the second end portion 538 are disposed to abut on the left side and the right side, respectively, of an outer peripheral surface of an outer ring of the drive bearing 534. The oscillating member 536 is formed in symmetry relative to an imaginary plane that passes the center of the oscillating member 536 in the up-down direction. The thickness of the first end portion 537 in the up-down direction is larger than the thickness of the second end portion 538 in the up-down direction.

When the motor 41 is driven, the eccentric shaft 531 rotates together with the output shaft 413, which causes the oscillating member 536 to oscillate within the specified angle range about the driving axis A1 of the spindle 51. The spindle 51 is thus driven for a rotary (pivotal) oscillating motion within the specified angle range around the driving axis A1 in response to oscillating movement of the oscillating member 536. As a result, the tool accessory 91 mounted to (on) the spindle 51 oscillates about the driving axis A1, which enables a processing operation to be performed on a workpiece using the oscillating tool accessory 91.

In this embodiment, the inner housing 3 has a structure for facilitating mounting (installation) of the driving mechanism 5 into the inner housing 3. Specifically, as shown in FIGS. 4 and 5, the inner housing 3 (specifically, the front part 31) has a front opening 323 and a rear opening 324. The front opening 323 is disposed in front of the oscillating member 536 such that the front opening 323 faces (opposes) the oscillating member 536 (specifically, the first end portion 537). The rear opening 324 is disposed behind the oscillating member 536 such that the rear opening 324 faces (opposes) the oscillating member 536 (specifically, the second end portion 538).

The front opening 323 is formed through a front wall of the front part 31 (the first housing part 311). More specifically, the front opening 323 generally correspond to a region between the upper bearing 513 and the lower bearing 514 in the up-down direction. The front opening 323 is provided for insertion of the oscillating member 536 into the inner housing 3 during assembling of the driving mechanism 5. Thus, the height of the front opening 323 in the up-down direction is at least larger than the maximum thickness of the oscillating member 536 (specifically, the thickness of the first end portion 537) in the up-down direction. The width of the front opening 323 in the left-right direction is at least larger than the maximum width of the oscillating member 536 (specifically, a distance between outer side surfaces of the bifurcated second end portion 538).

The rear opening 324 is formed through a rear wall of the front part 31 (the third housing part 313). The rear opening 324 is provided for insertion of a jig, which is used for appropriately positioning the second end portion 538 of the oscillating member 536 relative to the driving bearing 534 during the assembling of the driving mechanism 5. The height of the rear opening 324 in the up-down direction is smaller than the height of the front opening 323 in the up-down direction. The width of the rear opening 324 in the left-right direction is larger than the distance between the outer side surfaces of the bifurcated second end portion 538.

The center position of the front opening 323 in the up-down direction is offset upward from the center position of the rear opening 324 in the up-down direction. The reason of this difference of the center positions is as follows. When mounting (installing) the oscillating member 536 into the inner housing 3, it is necessary to position the oscillating member 536 in the up-down direction and a circumferential direction around the driving axis A1 such that the oscillating member 536 is placed at (in) a position (hereinafter referred to as a mounting position) at (in) which the second end portion 538 appropriately abuts on the outer ring of the driving bearing 534. In this embodiment, when the oscillating member 536 is placed at (in) the mounting position, the first end portion 537 is placed (abuts) on the inner ring of the lower bearing 514 of the spindle 51. Since the first housing part 311 needs to hold the bearing 514, the front opening 323 cannot be formed in an entire region of the first housing part 311 that is directly in front of the first end portion 537. Thus, in this embodiment, the front opening 323 is slightly offset (shifted) upward relative to this region.

In this embodiment, the spindle 51, the transmitting mechanism 53 and the motor 4 are mounted (installed) in the inner housing 3 (specifically, in the front part 31) using the front opening 323 and the rear opening 324 through the following procedure.

First, an assembler (a person who assembles the oscillating tool 1) inserts and fits the bearing 514 into the first housing part 311 through an open bottom of the first housing part 311, and fixes the bearing 514 at a specified position using a stopper ring. Thereafter, the assembler inserts the oscillating member 536 into the first housing part 311 through the front opening 323 and then moves the oscillating member 536 downward to be placed at the mounting position. The first end portion 537 is placed on the inner ring of the bearing 514. Thereafter, the assembler inserts the spindle 51 into the bearing 514 from below and press-fits and the lower end portion of the spindle 51 to the bearing 514 to be fixed to the bearing 514. The assembler inserts the jig through the rear opening 324 and holds the oscillating member 536 in the mounting position using the jig. The assembler inserts the rotor and the output shaft 413, on (around) which the fan 45, the eccentric shaft 531 and the driving bearing 534 are mounted, into the front part 31 through the open top of the second housing part 312. The eccentric shaft 531 is press-fitted into the two bearings, so that the mounting (installation) is completed.

As described above, in this embodiment, the front opening 323 and the rear opening 324 are respectively disposed in front of and behind the oscillating member 536. Thus, the oscillating member 536 can be inserted rearward into the front part 31 through the front opening 323. That is, the oscillating member 536 can be inserted into the front part 31 in (along) a direction that is different from a direction in (along) which the spindle 51, the output shaft 413 of the motor 4 and the eccentric shaft 531 are inserted into the front part 31. If, in a comparative case, the oscillating member 536 is inserted into the front part 31 from below the front part 31, similar to the spindle 51, it will be necessary to provide a corresponding opening in the bottom of the front part 31 and to cover this opening using another member and fix the member, after installing the oscillating member 536. On the contrary, according to this embodiment, the procedure of mounting (installing) the oscillating member 536 into the front part 31 can be rationalized.

Further, as shown in FIGS. 3 to 5, in this embodiment, a cover member 33 for covering the front opening 323 and the rear opening 324 is mounted (fitted) around the front part 31.

Figure 6:
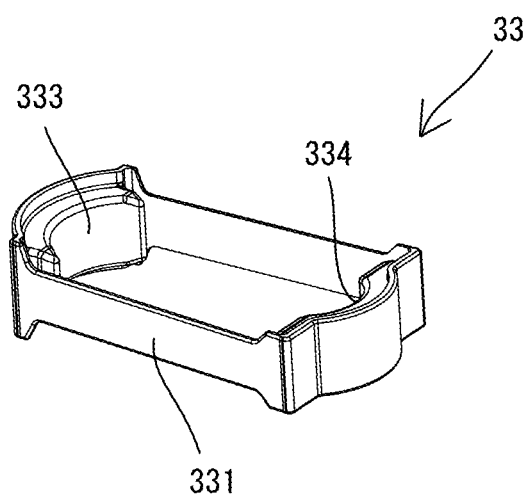
FIG. 6 is a perspective view of a cover member.

As shown in FIG. 6, the cover member 33 includes an annular (loop-shaped) part 331, a front cover part 333 and a rear cover part 334. In this embodiment, the annular part 331, the front cover part 333 and the rear cover part 334 are integrally formed by the same elastic material (for example, rubber or synthetic resin). Thus, the cover member 33 as a whole is formed as an annular (loop-shaped) elastic member.

The annular part 331 is a loop-shaped band (strip). The annular part 331 is configured to be mounted (fitted) around an outer periphery of the lower end portion of the front part 31 (specifically, around the lower end portions of the first housing part 311, and the third housing part 313) in a state in which the annular part 331 is slightly stretched (extended). The front cover part 333 is configured to be fitted in the front opening 323, and the rear cover part 334 is configured to be fitted in the rear opening 324. The front cover part 333 and the rear cover part 334 respectively protrude inward from inner peripheral surfaces of the front end portion and the rear end portion of the annular part 331. The front cover part 333 has an arc-like shape that protrudes forward. The rear cover part 334 has an arc-like shape that protrudes rearward. The height in the up-down direction of the front end portion of the annular part 331 that correspond to the front cover part 333 is larger than the height of the front cover part 333. The height in the up-down direction of the rear end portion of the annular part 331 that corresponds to the rear cover part 334 is larger than the height of the rear cover part 334.

The assembler can easily fit the cover member 33 around the outer periphery of the lower end portion of the front part 31, while stretching (extending) the cover member 33. As shown in FIGS. 4 and 5, when the cover member 33 is fitted around the outer periphery of the lower end portion of the front part 31, the annular part 331 is securely (firmly) held in contact with the outer peripheral surface of the lower end portion of the front part 31. The front cover part 333 and the rear cover part 334 are fitted in the front opening 323 and the rear opening 324, respectively, in a slightly compressed state, so that the front cover part 333 and the rear cover part 334 cover (close) the front opening 323 and the rear opening 324. This structure (design) can thus reduce the possibility (likelihood) that foreign matters (for example, dust, grit) enter the inner housing 3 through the front opening 323 and/or the rear opening 324. In addition, the annular part 331 is securely (firmly) held in contact with the outer peripheral surface of the lower end portion of the front part 31, around the front cover part 333 and the rear cover part 334. This structure (design) can reduce the possibility that the foreign matters enter further effectively.

The front cover part 333 and the rear cover part 334 are biased by the elastic force of the annular part 331 toward the inside of the front part 31 (i.e. biased in directions to cover the front opening 323 and the rear opening 324, respectively). This structure (design) can reduce the possibility that either one or both of the front cover part 333 and the rear cover part 334 come out of the front opening 323 and/or the rear opening 324. Further, the front cover part 333 and the rear cover part 334 each having the arc-like shape can reduce the possibility that the front cover part 333 and/or the rear cover part 334 interferes with the oscillating member 536 while the oscillating member 536 is oscillated.

The clamping mechanism 6 is now described.

The clamping mechanism 6 is configured to secure (fix) the tool accessory 91 to the tool mounting part 511 using a clamping shaft 61 such that the tool accessory 91 rotates (pivots back and forth) together with the spindle 51. The structure of the clamping mechanism 6 in this embodiment is substantially the same as the structure of the clamping mechanism disclosed in U.S. Patent Application Publication No. 2020/0282539, the contents of which are incorporated in its entirety herein by reference. Thus, the description thereof is omitted.

Figure 7:
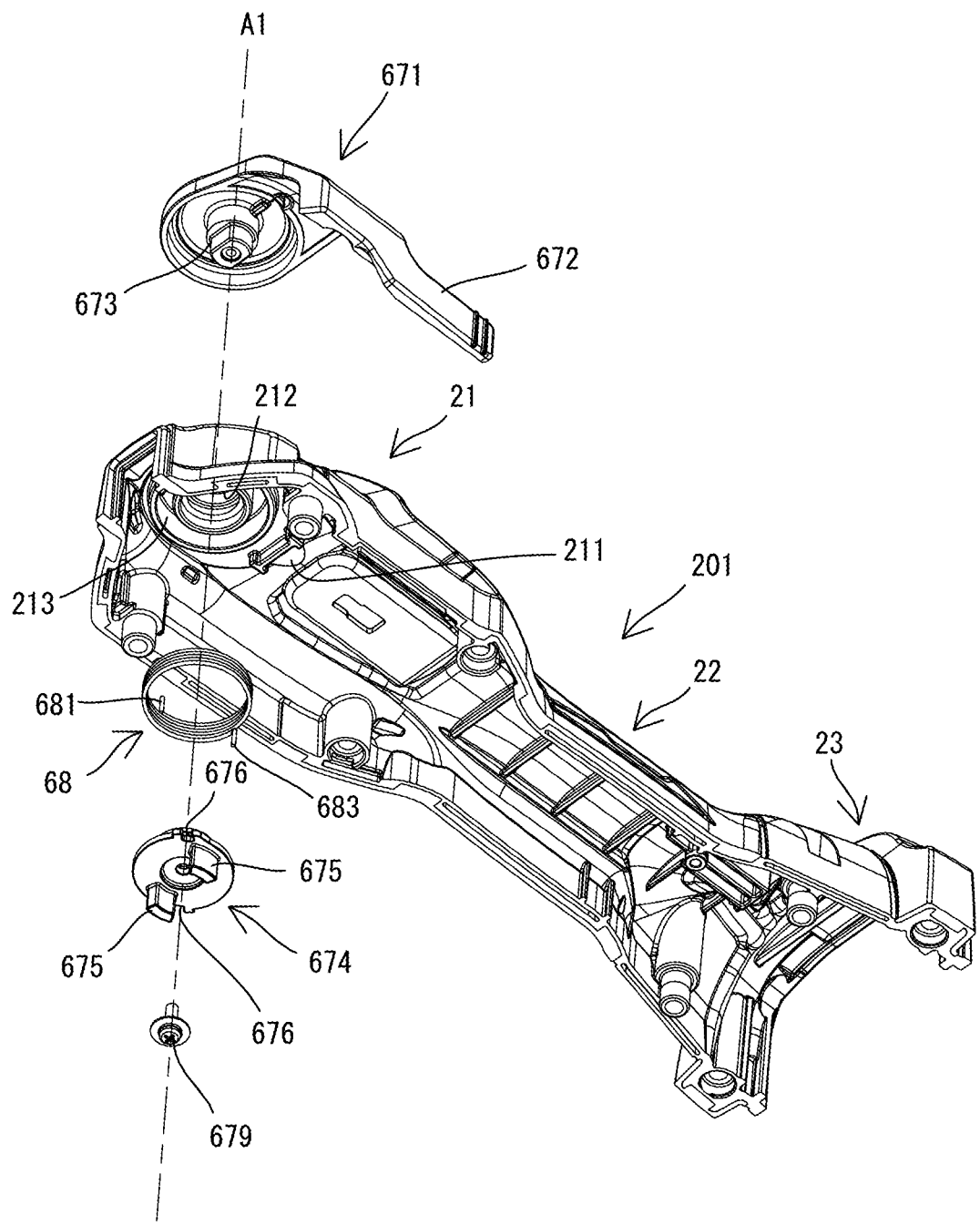
FIG. 7 is an exploded perspective view of an upper shell and a lever.

The clamping mechanism 6 is operably coupled to the lever 67 that is pivotably supported by (at) the front part 21 of the outer housing 2. In this embodiment, as shown in FIGS. 4 and 7, the lever 67 is mainly formed by a body 671, an actuation part 674 and a torsion coil spring 68.

The body 671 is rotatably (pivotably) supported around the driving axis A1 by an upper wall 211 of the front part 21 of the outer housing 2 (the upper shell 201). The body 671 has a manipulation part 672 that is disposed outside the front part 21 and configured to be manually operated (manipulated) by the user. The actuation part 674 is disposed above the clamping mechanism 6 within the front part 21 and is fixed to a lower side of the body 671 by a screw 679. The actuation part 674 has a circular plate-like shape. The actuation part 674 has a pair of (two) actuating protrusions 675 that is configured to act on the clamping mechanism 6 for actuating the clamping mechanism 6.

The torsion coil spring 68 is arranged around a center portion of the lever 67 in the up-down direction. A first end 681 of the torsion coil spring 68 is locked (engaged, held) in a locking hole (not shown) formed on the upper wall 211 of the upper shell 201. A second end (other end) 683 of the torsion coil spring 68 is locked (engaged, held) in one of two locking recesses 676 formed in the outer edge of the actuation part 674. Owing to this structure, the lever 67 is biased by the torsion coil spring 68 toward an initial position at (in) which the manipulation part 672 abuts on the left wall of the upper shell 201. The two locking recesses 676 are provided to facilitate positioning of the actuation part 674 relative to the body 671.

The clamping mechanism 6 operates in response to a manual pivoting operation (pivoting manipulation) of the lever 67. Specifically, when the lever 67 is pivoted from the initial position in a specified direction (specifically, a clockwise direction as viewed from above), the lever 67 actuates the clamping mechanism 6 via the actuating protrusions 675, so that clamping of the tool accessory 91 is released. On the other hand, when the lever 67 is pivoted from a release position in a direction opposite to the direction for releasing the clamping of the tool accessory 91, the lever 67 actuates the clamping mechanism 6 via the actuating protrusions 675, so that the tool accessory 91 is clamped.

Figure 8:
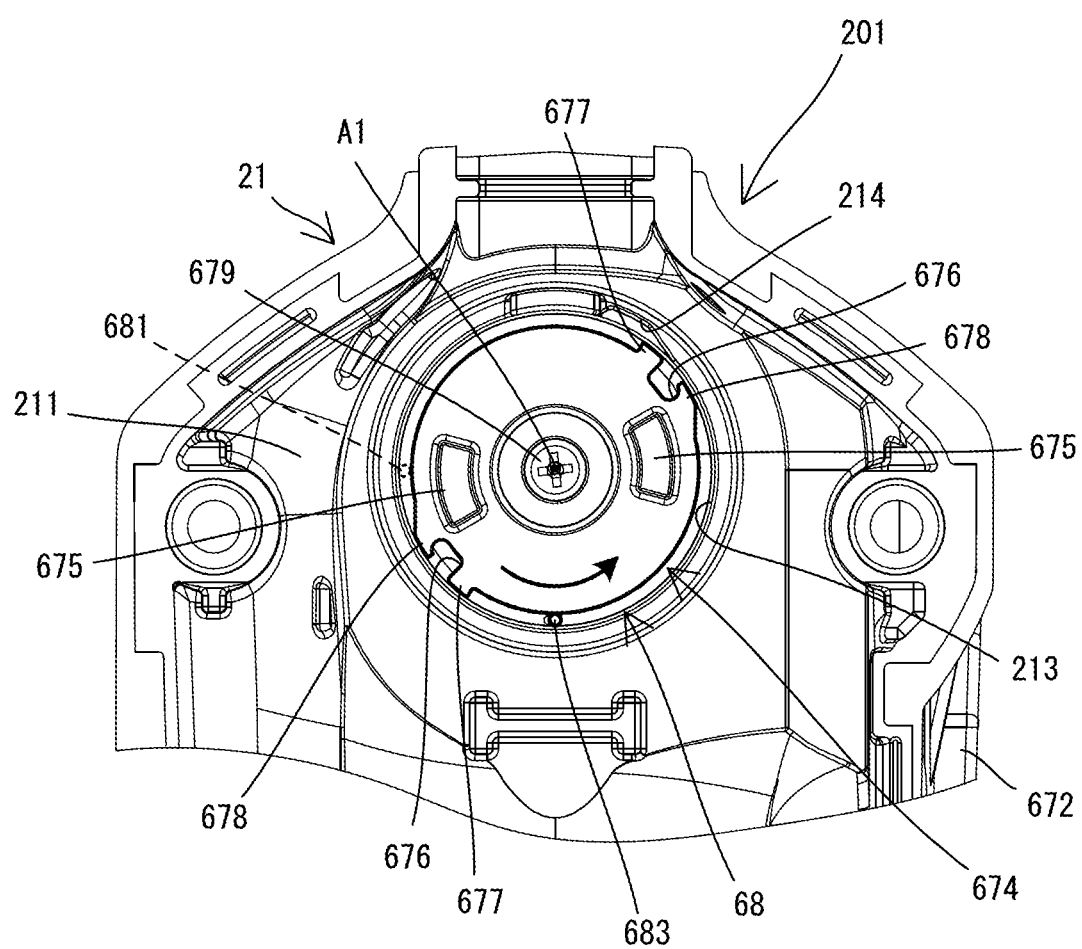
FIG. 8 is an explanatory view of mounting (installing) the lever on the upper shell.

In this embodiment, the lever 67 and the upper shell 201 are configured to facilitate mounting (coupling, installation) of the lever 67 on the upper shell 201. More specifically, as shown in FIGS. 4, 7 and 8, two protrusions 677, 678 are disposed on both sides of each of the locking recesses 676 in a circumferential direction of the actuation part 674. Each of the protrusions 677, 678 protrudes radially outward. A support hole 212 and a spring housing part 213 are provided in the upper wall 211 of the upper shell 201. The spring housing part 213 is an annular recess formed around the support hole 212. In addition, a release recess 214 is recessed radially outward from a portion of an outer edge of the spring housing part 213.

The mounting (coupling, installation) of the lever 67 to the upper shell 201 is performed through the following procedure.

First, the assembler inserts an engagement protrusion 673, which protrudes downward from a center portion of a base part of the body 671, through the support hole 212 of the upper wall 211. At this time, the assembler positions the body 671 relative to the upper shell 201 such that the manipulation part 672 is arranged at the initial position. The assembler places the torsion coil spring 68 within the spring housing part 213 and fits the first end 681 of the torsion coil spring 68 into the locking hole (not shown). Thereafter, the assembler positions the actuation part 674 relative to the body 671 in the circumferential direction, and secures (fixes) the actuation part 674 to the body 671 using the screw 679 such that the actuation part 674 is non-rotatable relative to the body 671.

Figure 9:
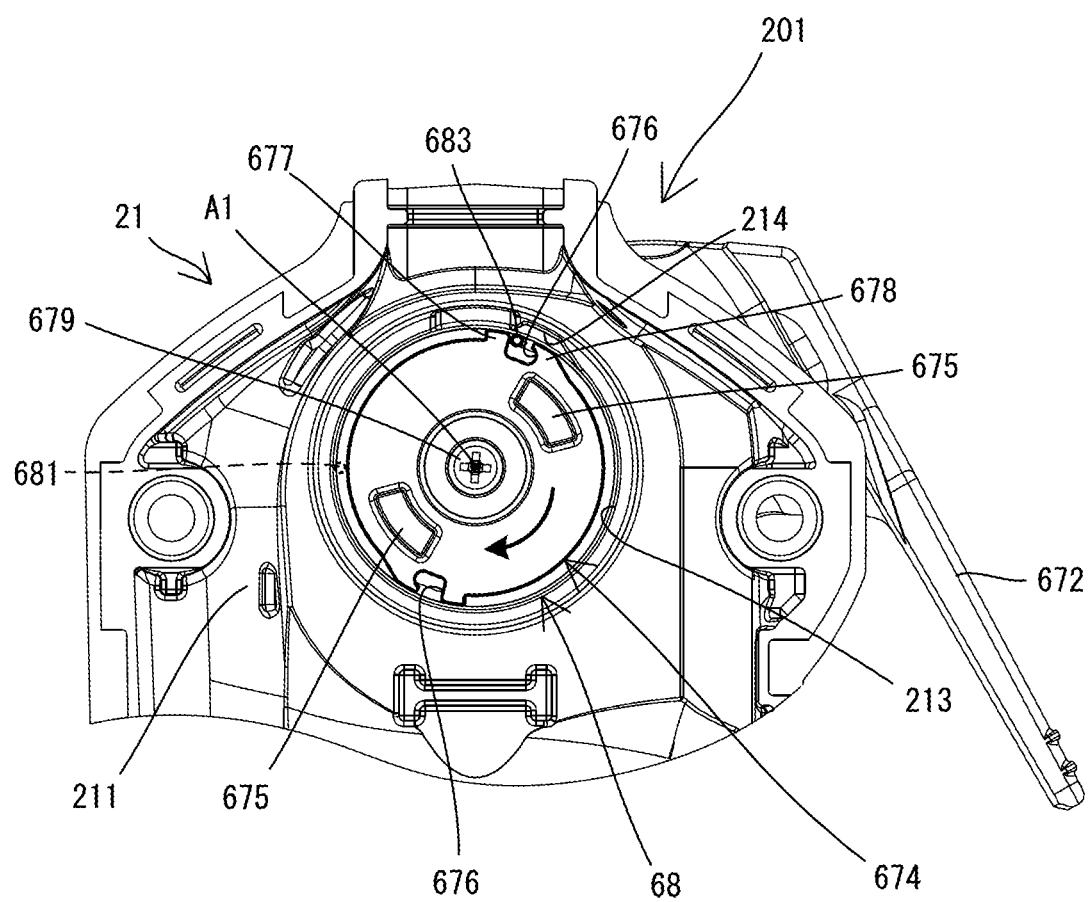
FIG. 9 is another explanatory view of mounting (installing) the lever on the upper shell.

As shown in FIG. 8, at this stage, the second end 683 of the torsion coil spring 68 does not engage with the locking recess 676 and thus the second end 683 is located radially outward of the actuation part 674. Thereafter, the assembler pivots the lever 67 around the driving axis A1 relative to the upper shell 201 in the counterclockwise direction (in a direction of an arrow in FIG. 8) as viewed from the side of the actuation part 674 (i.e., from below). When the lever 67 is pivoted to a specified position, as shown in FIG. 9, one of the two locking recesses 676 that is closer to the release recess 214 is positioned to face the release recess 214.

The assembler then moves the second end 683 of the torsion coil spring 68 in the counterclockwise direction as viewed from below, while applying a load to the torsion coil spring 68 (i.e., elastically deforming and winding the torsion coil spring 68) in a state in which the lever 67 is maintained at (in) the specified position. As shown in FIG. 9, after the second end 683 reaches the release recess 214 and passes the protrusion 678 within the release recess 214, the second end 683 moves into the locking recess 676 from the release recess 214. The actuation part 674 is thus biased by the elastic force of the torsion coil spring 68 in the clockwise direction as viewed from below (in a direction of an arrow in FIG. 9). Accordingly, the lever 67 is pivoted in a state in which the second end 683 is locked (engaged, held) within the locking recess 676, so that the lever 67 is positioned (placed) at (in) the initial position.

As described above, in this embodiment, the assembler first positions and fixedly connects the body 671 and the actuation part 674. The assembler then pivots the lever 67 from the initial position by a specified amount and hold it in the position. In this state, the assembler moves (pivots) the second end 683 in the circumferential direction. Through this simple procedure, the assembler can lock (engage) the second end 683 with the locking recess 676 and cause the torsion coil spring 68 to bias the lever 67 toward the initial position. Thus, this procedure facilitates the mounting (coupling, installation) of the lever 67 to the upper shell 201, compared to a procedure in which the assembler locks (engages) the second end 683 with the actuation part 674 in advance, and positions the body 671 and the actuation part 674 and fixedly connect the body 671 and the actuation part 674 using the screw 679 while applying a load to the torsion coil spring 68.

The structures (elements) disposed within the rear part 39 are now described.

As shown in FIGS. 1 and 2, in this embodiment, the rear portion of the rear part 39 is configured as the battery mounting part 391 and the front portion of the rear part 39 is configured as a control-unit housing part 392.

The battery mounting part 391 includes an engagement structure for sliding engagement with the battery 93, and terminals that are electrically connectable to corresponding terminals of the battery mounting part 391. The battery mounting part 391 and the structure thereof are well-known, and therefore the descriptions thereof are omitted.

The control-unit housing part 392 houses a control unit 395. Although not shown in detail, the control unit 395 includes a three-phase inverter, a control circuit (for example, a microcomputer including a CPU) that controls driving of the motor 4 via the three-phase inverter, a circuit board having the three-phase inverter and the control circuit mounted thereon, and a case that houses the circuit board. The control unit 395 is electrically connected with the battery mounting part 391, the switch unit 26, and the motor 4 via unshown wires. The control unit 395 is configured to drive the motor 4 while the switch unit 26 is ON.

The rear part 39 of the inner housing 3 with the battery 93 mounted thereon and with the control unit 395 housed therewithin can increase the moment of inertia of the inner housing 3 around the driving axis A1, so that the vibration of the inner housing 3 can be reduced.

The structures (elements) disposed within the extending part 35 are now described.

As described above, in this embodiment, the motor 4 and the driving mechanism 5 are disposed within the front part 31, and the control unit 395 and the battery mounting part 391 are disposed within the rear part 39. Thus, although not shown, wires and connection terminals that electrically connect the control unit 395 and the circuit board for the motor 4 are disposed in the extending part 35.

The structures (elements) disposed within the elastic connection part 37 are now described.

As shown in FIGS. 1 to 3, a switch holder 25 is arranged in an internal space of the elastic connection part 37 (i.e., a space circumferentially surrounded by the elastic members 371). The switch holder 25 is configured to hold the switch unit 26. Even though the switch holder 25 is arranged in the internal space of the elastic connection part 37, the switch holder 25 is fixed to the upper shell 201 and the lower shell 205, and thus integrated with the outer housing 2. More specifically, as shown in FIG. 2, the switch holder 25 includes a generally rectangular box-like body 251 and cylindrical parts 254. The cylindrical parts 254 are respectively disposed on a left front portion and on a right front portion of the body 251. Each of the cylindrical parts 254 extends in the up-down direction. Although now shown in detail, the switch holder 25 is fixed to the upper shell 201 and the lower shell 205 by screws inserted through the cylindrical parts 254.

Figure 10:
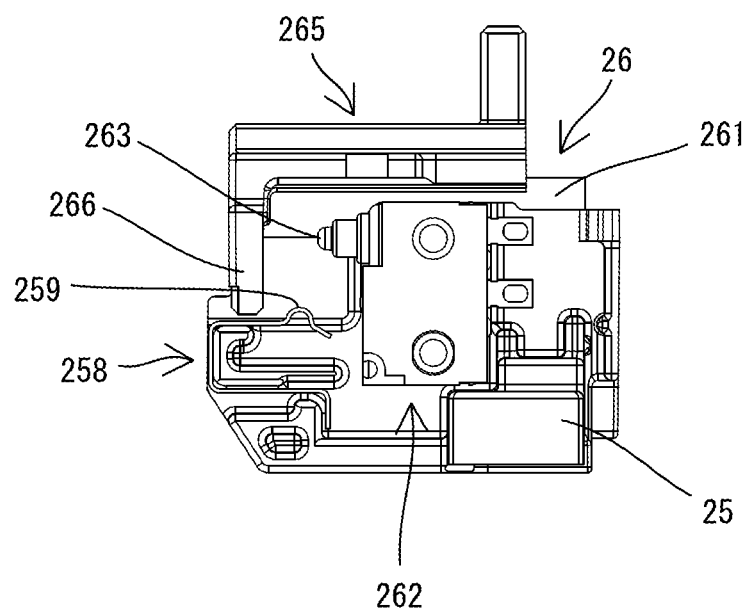
FIG. 10 is a right side view of a switch unit and a switch holder when a switch lever is at (in) an OFF position, wherein a portion of the switch holder is not shown.

The switch unit 26 is now described. As shown in FIG. 10, the switch unit 26 of this embodiment includes a first switch 261 and a second switch 262. The first switch 261 is a slide-switch of a well-known type in which a circuit is opened and closed, using a slider that is linearly movable. The second switch 262 is a micro-switch of a well-known type in which a circuit is opened and closed in response to a slight movement caused by a snap-action mechanism. The second switch 262 is arranged rightward of the first switch 261. A plunger 263 of the second switch 262 protrudes rearward.

As shown in FIG. 1, the switch unit 26 is operably coupled to the operation part 275 via a connection member 27. The connection member 27 is an elongate member disposed between the upper shell 201 and the extending part 35 of the inner housing 3 and linearly extending in the front-rear direction. A front end portion of the connection member 27 is connected to the operation part 275. A rear end portion of the connection member 27 is connected to a switch lever 265.

The switch lever 265 is disposed above the first switch 261 and is supported by the switch holder 25 (only partially shown in FIG. 10) to be movable in the front-rear direction. The switch lever 265 moves in the front-rear direction between an ON position and an OFF position in response to a manual sliding operation of the operation part 275 in the front-rear direction, so that each of the first switch 261 and the second switch 262 is turned ON and OFF. More specifically, the switch lever 265 is connected to a slider (not shown) of the first switch 261. Thus, the slider of the first switch 261 moves in the front-rear direction integrally with the switch lever 265. Further, the switch lever 265 includes a pressing piece 266 arranged behind the plunger 263 of the second switch 262.

As shown in FIG. 10, when the switch lever 265 is at (in) the OFF position, the first switch 261 is OFF. At this time, the pressing piece 266 is spaced apart rearward from the plunger 263, and thus the second switch 262 is also OFF. On the other hand, as shown in FIG. 1, when the switch lever 265 is at (in) the ON position, the first switch 261 is ON. At this time, the pressing piece 266 presses the plunger 263 and thus the second switch 262 is also ON.

In this embodiment, when both of the first switch 261 and the second switch 262 are ON, the switch unit 26 is ON. When at least one of the first switch 261 and the second switch 262 is OFF, the switch unit 26 is OFF. As described above, the ON and OFF of the switch unit 26 is used by the control unit 395 for controlling the driving of the motor 4.

As described above, the second switch 262 is a microswitch. Therefore, the second switch 262 may be unexpectedly turned OFF, in response to only a slight movement of the switch lever 265. Such a slight movement may be caused by a dimensional error and/or an assembling error of the second switch 262 and/or the switch holder 25, or the structure that the plunger 263 is biased rearward. In other words, the ON/OFF state of the switch unit 26 may be unstable. To cope with this, in this embodiment, a flat spring 258 for stably holding the switch lever 265 in the ON position is mounted on the switch holder 25.

Figure 11:
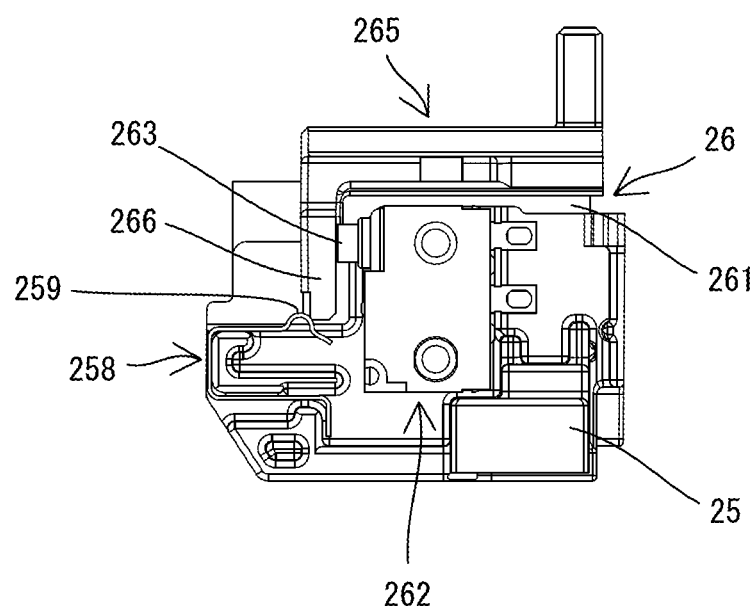
FIG. 11 is a right side view of the switch unit and the switch holder when the switch lever is at (in) an ON position.

The flat spring 258 is arranged below the pressing piece 266. The flat spring 258 has a protrusion 259 protruding upward. In the middle of the process in which the switch lever 265 moves forward from the OFF position shown in FIG. 10, the protrusion 259 is depressed by the lower end portion of the pressing piece 266 and the flat spring 258 is deformed downward to allow the pressing piece 266 to move forward. As shown in FIG. 11, when the pressing piece 266 passes the protrusion 259 and the switch lever 265 reaches the ON position, the flat spring 258 returns upward. The flat spring 258 biases the pressing piece 266 forward in a state in which the protrusion 259 abuts on the lower end portion of the pressing piece 266 from behind, so that the flat spring 258 stably holds the switch lever 265 in the ON position. When the switch lever 265 is moved from the ON position to the OFF position, the flat spring 258 is similarly deformed downward to allow the pressing piece 266 to move rearward. When the pressing piece 266 passes the protrusion 259, the flat spring 258 returns upward.

Structures that elastically connect the outer housing 2 and the inner housing 3 are now described. In this embodiment, the outer housing 2 and the inner housing 3 are elastically connected (coupled) to each other at multiple positions. Specifically, elastic members are disposed between the front part 21 of the outer housing 2 and the front part 31 of the inner housing 3, and between the switch holder 25 and the rear part 39 of the inner housing 3.

First, structures that elastically connect the front part 21 of the outer housing 2 and the front part 31 of the inner housing 3 are described.

Figure 12:
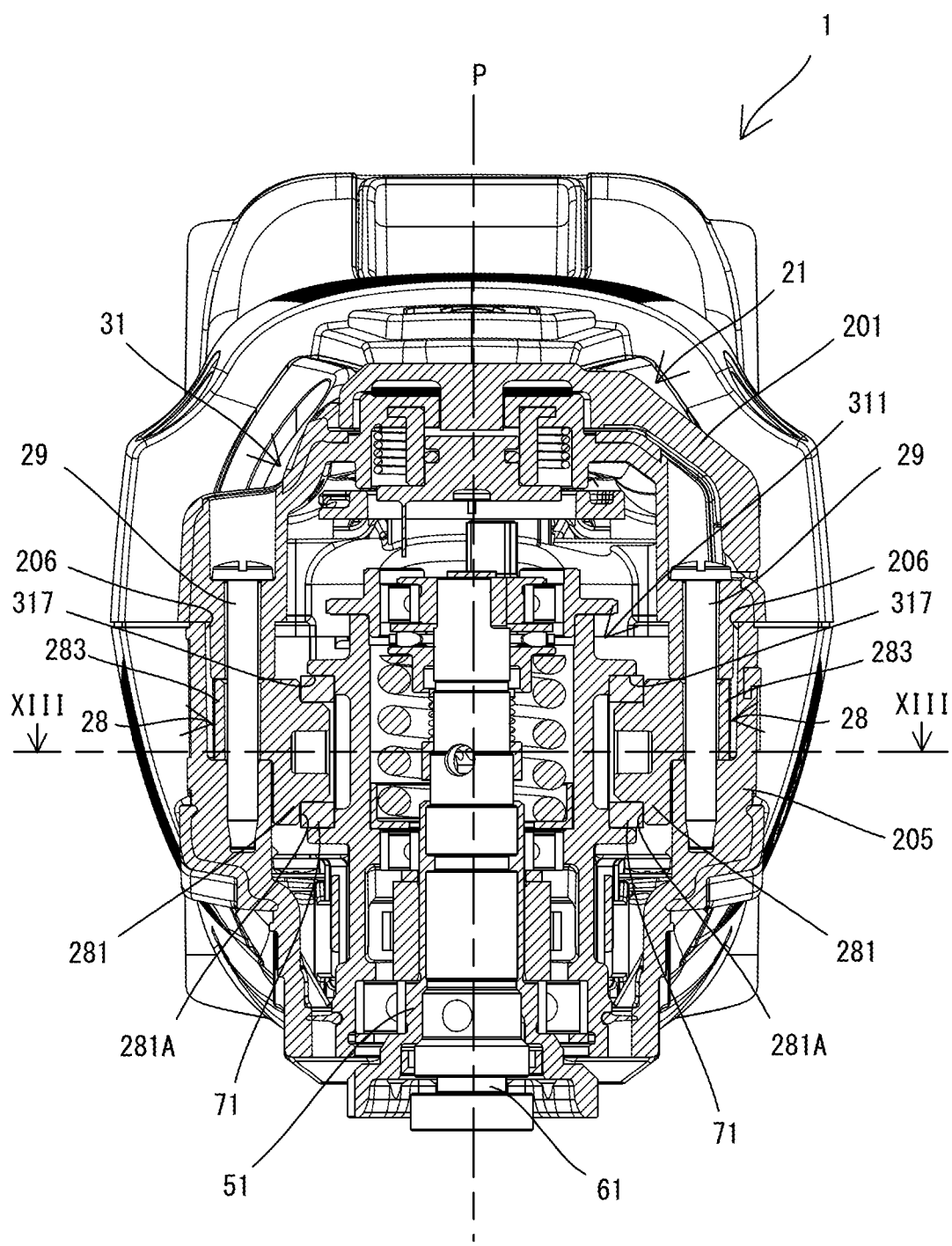
FIG. 12 is a sectional view taken along line XII-XII in FIG. 2.
Figure 13:
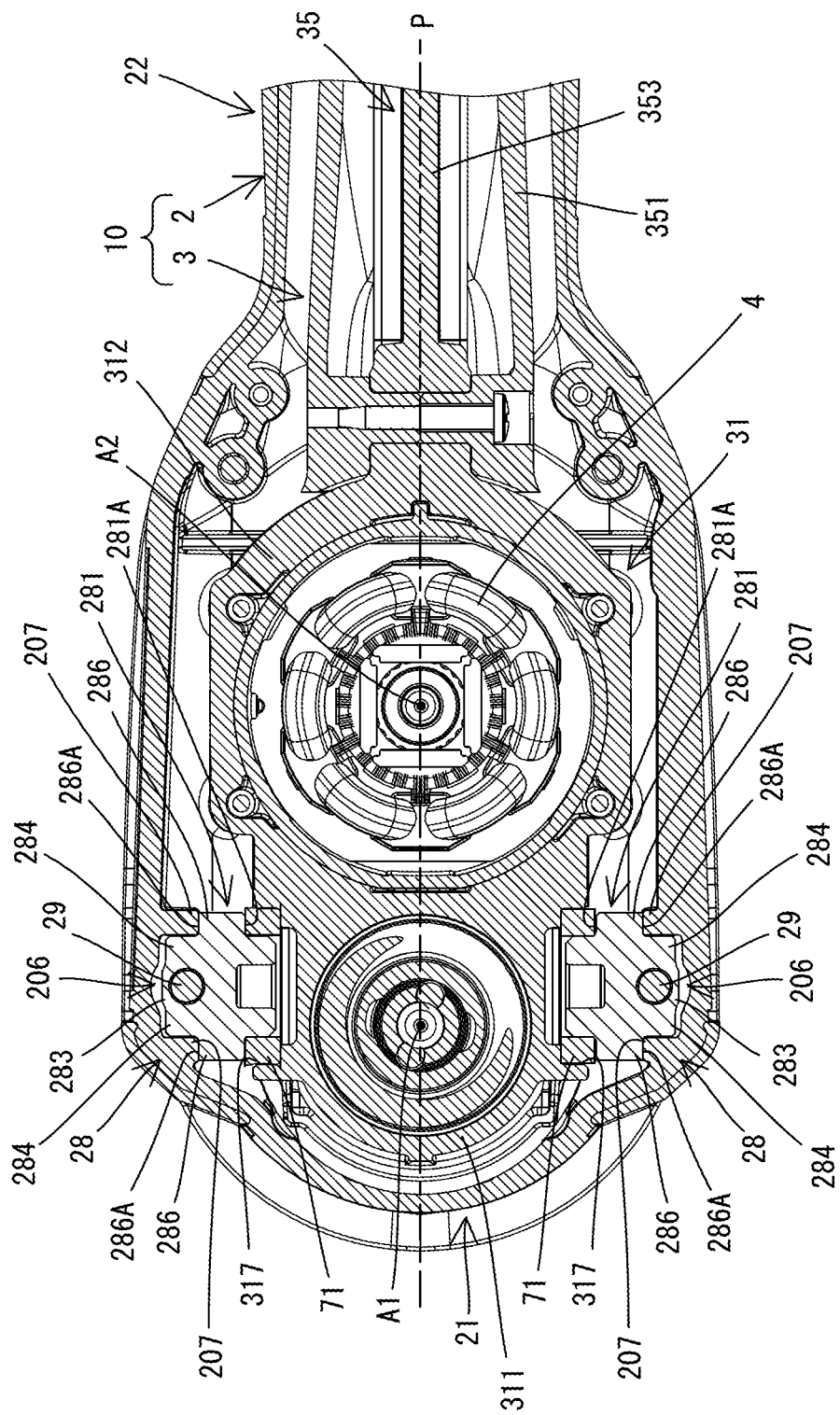
FIG. 13 is a sectional view taken along line XIII-XIII in FIG. 12.

As shown in FIGS. 12 and 13, recesses 317 are respectively formed in the left portion and the right portion of the first housing part 311 of the front part 31. Each of the recesses 317 has a circular section. The left and right recesses 317 have the same structure and are arranged in symmetry (in plane symmetry) relative to the plane P. A front elastic member 71, which has a hollow cylindrical shape, is fitted in each recess 317 in a state in which the front elastic member 71 is slightly compressed in its radial direction. In this embodiment, the front elastic members 71 are each formed of urethane-based synthetic resin (polymer) having a microfoam structure (also referred to as a microcellular structure).

In this embodiment, the left and right front elastic members 71 are pressed against the front part 31 and held by left and right interposing members 28, respectively, in a state in which the front elastic members 71 are compressed in the left-right direction. The left and right interposing members 28 are fixed (secured) to the outer housing 2 on the left side and on the right side of the front part 31, respectively, in a state in which the interposing members 28 are in partial contact with the inner surface of the outer housing 2. More specifically, each of the interposing members 28 is fixed (secured) to the upper shell 201 and the lower shell 205. The left and right interposing members 28 have the same structure and are arranged in symmetry (in plane symmetry) relative to the plane P.

Figure 14:
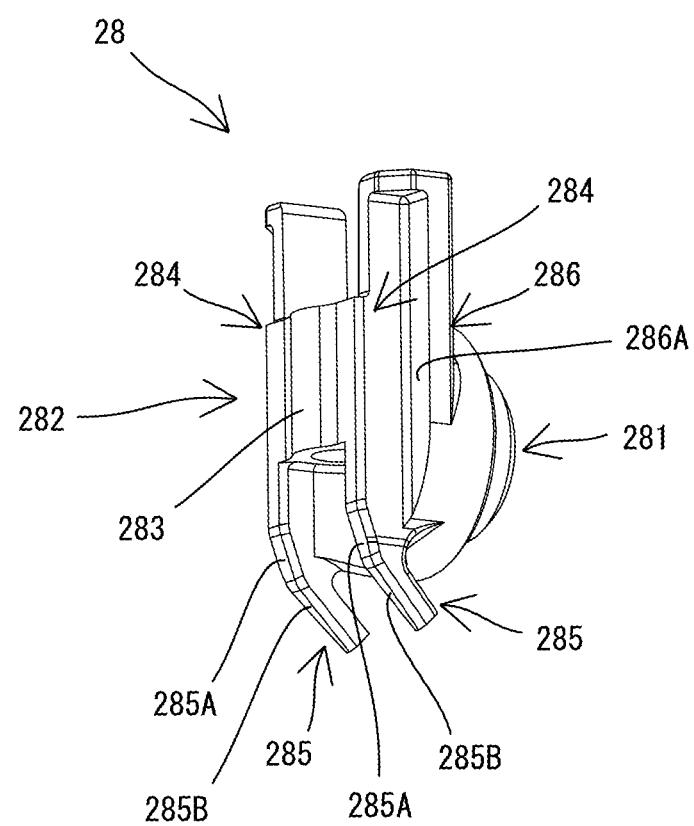
FIG. 14 is a perspective view of an interposing member.

The detailed structure of the interposing member 28 is now described. As shown in FIGS. 12 to 14, the interposing member 28 includes a first portion 281 configured to engage with the front elastic member 71, and a second portion 282 configured to engage with the outer housing 2. The first portion 281 and the second portion 282 are integrally molded from synthetic resin (plastic, polymer).

The first portion 281 includes a disc part and a projection. The disc part is arranged such that a straight line extending in the left-right direction intersects (specifically, substantially orthogonally intersects) a flat surface of the disc part. The protrusion protrudes from the center portion of the disc part in a direction that is substantially orthogonal to the flat surface of the disc part (i.e., protrudes substantially in the left-right direction). The protrusion of the first portion 281 has the outer diameter slightly larger than the inner diameter of the front elastic member 71. The protrusion is fitted into the center hole of the front elastic member 71, so that the circumference of the protrusion is substantially entirely covered by the front elastic member 71. A tip end of the protrusion is spaced apart from a bottom surface of the recess 317. The disc part abuts on one surface of the front elastic member 71 (a surface facing the outer housing 2) around the protrusion. Thus, the disc part has an annular pressing surface 281A. The protrusion of the first portion 281 is movable within the recess 317 while compressing the front elastic member 71, in all of the up-down direction, the front-rear direction and the left-right direction.

The second portion 282 includes a tubular part 283, a pair of (two) extending parts 284 and a pair of (two) contact parts 286.

The tubular part 283 is arranged on the opposite of the disc part of the first portion 281 from the protrusion of the first portion 281 (i.e. arranged on a side closer to the outer housing 2). The tubular part 283 extends from a substantially center of the disc part to an upper end of the disc part in up-down direction. The tubular part 283 is held (interposed, sandwiched) between a hollow cylindrical portion of the upper shell 201 and a hollow cylindrical portion of the lower shell 205, and is connected to the upper shell 201 and to the lower shell 205 by a screw 29, which is screwed into a screw hole formed in the cylindrical portion of the lower shell 205 (see FIG. 12). Thus, the interposing member 28 is connected to the outer housing 2 while positioned relative to the outer housing 2.

Each of the extending parts 284 extends in the up-down direction. The two extending parts 284 are disposed adjacent to the tubular part 283, on opposite sides of (specifically, in front of and behind) the tubular part 283. The front extending part 284 and the rear extending part 284 are formed in symmetry relative to the tubular part 283. The extending part 284 is longer than the diameter of the disc part of the first portion 281. The extending part 284 thus protrudes radially outward from the upper end and the lower end of the disc part. Thus, the upper end and the lower end of the extending part 284 define the upper end and the lower end of the interposing member 28, respectively.

An outer surface of a lower end portion 285 of each of the extending parts 284 includes a surface that faces the outer housing 2. This surface is inclined (extends obliquely) to be closer to the inner housing 3 (i.e., to be closer to the plane P or to the first portion 281) as it extends downward (i.e., toward the lower end of the extending part 284). In this embodiment, this surface is inclined with two steps. More specifically, this surface includes a first inclined surface (first oblique surface) 285A and a second inclined surface (second oblique surface) 285B that is connected to a lower end of the first inclined surface 285A and extends downward. An angle of inclination of the second inclined surface 285B with respect to the up-down direction (specifically, an angle between the plane P and the second inclined surface 285B) is larger than an angle of inclination of the first inclined surface 285A with respect to the up-down direction (specifically, an angle between the plane P and the first inclined surface 285A). The first inclined surface 285A and the second inclined surface 285B serve to facilitate mounting (installation) of the interposing member 28 into the outer housing 2, as will be described in detail below.

The two contact parts 286 extend forward and rearward from the extending parts 284, respectively. The contact parts 286 are arranged above the lower ends of the extending parts 284 in the up-down direction. A lower end of the contact part 286 is arranged below the upper end of the lower end portion 285 in the up-down direction. Specifically, the lower end of the contact part 286 is located between the upper end and the lower end of the first inclined surface 285A. Each of the contact parts 286 has a contact surface 286A that is configured to abut (contact) the inner surface of the outer housing 2 (i.e., a right surface of the left wall or a left surface of the right wall of the outer housing 2). A straight line extending in the left-right direction intersects (specifically, substantially orthogonally intersects) the contact surface 286A. The contact surface 286A is substantially parallel to the pressing surface 281A of the first portion 281. The contact surface 286A and the pressing surface 281A partially overlap with each other in the left-right direction (when viewed from the left or right). To put it differently, a straight line extending in the left-right direction extends through a portion of the contact surface 286A and a portion of the pressing surface 281A.

The mounting (installation) of the front elastic members 71 and the interposing members 28 to the housing 10 is now described.

First, the assembler fits the front elastic members 71 into the left and right recesses 317 of the front part 31 of the inner housing 3, respectively. Next, the assembler fits the protrusion of the first portion 281 of each of the interposing members 28 into the corresponding front elastic member 71. The interposing members 28 are held by the elastic force of the corresponding front elastic members 71, and temporarily connected (coupled) to the inner housing 3 via the front elastic members 71 (see FIG. 3). In this state, the assembler can handle the inner housing 3, the front elastic members 71 and the interposing members 28 integrally (as a single unit).

The assembler puts the inner housing 3 with the front elastic members 71 and the interposing members 28 connected thereto into the lower shell 205, which has been placed on a workbench such that the lower shell 205 opens upward. Recesses 206 are formed in the upper portions of the left wall and the right wall of the lower shell 205, respectively, and open upward. Each of the recesses 206 has a shape that corresponds to the tubular part 283 and the extending parts 284 of the interposing member 28. The assembler positions the tubular part 283 and the extending parts 284 of each interposing member 28 relative to the corresponding recess 206, and moves the inner housing 3 downward relative to the lower shell 205.

The lower ends of the extending parts 284 of the interposing members 28, that is, the lower ends of the portions having the second inclined surfaces 285B, enter the lower shell 205 first. Therefore, the possibility (likelihood) can be reduced that the lower ends of the interposing members 28 interfere with the upper end (open edge) of the lower shell 205 when the interposing members 28 enter the lower shell 205. The assembler can easily insert the lower end portions 285 into the lower shell 205 (specifically, into the recesses 206). The portions having the first inclined surfaces 285A can also enter the lower shell 205 (the recesses 206) smoothly, following the portions having the second inclined surfaces 285B.

When the assembler further moves the inner housing 3 downward relative to the lower shell 205, the contact surfaces 286A of the contact parts 286 of each interposing member 28 abut on (come into contact with) the inner surface of the lower shell 205 (specifically, protruding end surfaces of a pair of (two) ribs 207 that define the recess 206). In this state, as the assembler further moves the inner housing 3 downward relative to the lower shell 205, the front elastic members 71 are pressed against the inner housing 3 and compressed in the left-right direction. When the lower ends of the tubular parts 283 substantially abut on (come into contact with) the upper ends of the corresponding cylindrical parts of the lower shell 205, the operation of mounting (installing, accommodating) the inner housing 3 into the lower shell 205 is completed. The assembler places (positions) the upper shell 201 on the lower shell 205 and fastens the screws 29. The mounting (installation) of the front elastic members 71 and the interposing members 28 with respect to the housing 10 is completed.

As described above, each of the interposing members 28 has the lower end portions 285 each having the first inclined surface 285A and the second inclined surface 285B. Therefore, the interposing members 28 can make it easier for the assembler to insert the front elastic members 71 between the inner housing 3 and the lower shell 205 of the outer housing 3 while compressing the front elastic members 71 in the left-right direction.

Further, in a state in which the interposing members 28 are disposed between the inner housing 3 and the lower shell 205, the contact surfaces 286A, which are different from the first inclined surfaces 285A and the second inclined surfaces 285B, are held in contact with the inner surface of the lower shell 205 (specifically, with the protruding end surfaces of the ribs 207 that define the recess 206). Thus, by simply securing the dimensional accuracy of the contact surfaces 286A of the interposing members 28 and the ribs 207 of the outer housing 2, each of the front elastic members 71 can be appropriately supported, which facilitates the dimensional management and thus the manufacturing of the interposing members 28. In this embodiment, in a state in which the interposing members 28 are disposed between the inner housing 3 and the lower shell 205, the first inclined surfaces 285A and the second inclined surfaces 285B are not substantially in contact with the inner surface of the lower shell 205 (the surface that defines the recess 206). However, the first inclined surfaces 285A and the second inclined surfaces 285B may be configured to contact the inner surface of the lower shell 205 in this state.

Structures that elastically connect the switch holder 25 and the rear part 39 are now described.

As shown in FIG. 2, recesses 252 are respectively formed in left and right walls of the body 251 of the switch holder 25. Each of the recesses 252 is recessed inward (toward the plane P). The left and right recesses 252 have the same structure and are arranged in symmetry relative to the plane P. The rear elastic members 73 are respectively fitted in the recesses 252. Like the front elastic members 71, the rear elastic members 73 are also formed of urethane-based synthetic resin having the microfoam structure.

An arm 393 protrudes forward from each of the left and right walls of the rear part 39 (the control-unit housing part 392) of the inner housing 3. A projection is formed on (at) a tip end portion of each arm 393 and protrudes inward (toward the plane P). A tip end portion of each arm 393 is in contact with an outside surface of the corresponding rear elastic member 73, and the projections are respectively fitted in the recesses disposed in the rear elastic members 73. The circumference of the protrusion of each arm 393 is substantially entirely covered by the rear elastic member 73. A tip end of the projection of each arm 393 is spaced apart from a bottom of the recess 252. Therefore, the tip end portion of each arm 393 is movable within the recess 252 while compressing the rear elastic member 73, in all of the up-down direction, the front-rear direction and the left-right direction.

As described above, in this embodiment, the outer housing 2 and the inner housing 3 are connected via the front elastic members 71 and the rear elastic members 73 such that the outer housing 2 and the inner housing 3 are movable in all directions relative to each other. Owing to this structure (design), transmission of vibration from the inner housing 3 to the outer housing 2 can be effectively reduced during the oscillatory driving of the tool accessory 91.

Further, in this embodiment, as shown in FIGS. 1 to 3, a restricting part 8 is provided on the rear part 39 of the inner housing 3 and in the rear part 23 of the outer housing 2. The restricting part 8 is configured to restrict (limit) movement of the inner housing 3 relative to the outer housing 2. In this embodiment, the restricting part 8 includes four separate restricting parts. Specifically, the restricting part 8 includes an upper restricting part 81, a lower restricting part 82, a left restricting part 83 and a right restricting part 84. Each of the upper restricting part 81, the lower restricting part 82, the left restricting part 83 and the right restricting part 84 includes a pair of (two) contact parts (specifically, a recess and a protrusion) that are configured to abut on (make contact with) each other.

The upper restricting part 81 includes a recess 811 formed in the upper wall of the rear part 23 and a protrusion 815 formed on the upper wall of the rear part 39. The recess 811 is recessed upward from the lower surface of the upper wall of the rear part 23. The recess 811 is configured as a groove extending substantially from the left edge to the right edge of the upper wall of the rear part 23 in the left-right direction. The recess 811 has a substantially rectangular section and is defined by a front surface, a rear surface and an upper surface. The protrusion 815 protrudes upward from the upper surface of the upper wall of the rear part 39. The protrusion 815 is configured as an elongate protrusion extending in the left-right direction. The protrusion 815 is located in the center portion of the upper wall of the rear part 39 in the left-right direction. The protrusion 815 has a substantially rectangular section and has a front surface, a rear surface and an upper surface.

The protrusion 815 is disposed within the recess 811. There is a gap between a tip end of the protrusion 815 and the bottom (the upper surface) of the recess 811. The width of the recess 811 in the front-rear direction is larger than the width of the protrusion 815 in the front-rear direction. In an initial state in which the outer housing 2 and the inner housing 3 are not moving relative to each other, there is a gap in front of the protrusion 815 and there is another gap behind the protrusion 815. When the rear part 23 and the rear part 39 move relative to each other, a portion of the protrusion 815 abuts (comes into contact with) at least one of the surfaces that defines the recess 811, so that a movable range of the rear part 23 and the rear part 39 relative to each other is restricted (limited). More specifically, the gap between the front surface of the protrusion 815 and the front surface of the recess 811 defines a forward movable range of the upper end portion of the rear part 39 relative to the upper end portion of the rear part 23. The gap between the rear surface of the protrusion 815 and the rear surface of the recess 811 defines a rearward movable range of the upper end portion of the rear part 39 relative to the upper end portion of the rear part 23.

Each of the gap in the up-down direction between the tip end of the protrusion 815 and the bottom surface of the recess 811, the gap between the front surface of the protrusion 815 and the front surface of the recess 811, and the gap between the rear surface of the protrusion 815 and the rear surface of the recess 811 is smaller than a gap between the outer surface of the other portion of the inner housing 3 (i.e., the outer surfaces of the front part 31, the extending part 35 and the elastic connection part 37) and the inner surface of the outer housing 2. Further, the gaps between the protrusion 815 and the recess 811 are set such that the inner housing 3 and the outer housing 2 do not come into contact with each other when the inner housing 3 vibrates during the oscillatory driving of the tool accessory 91.

The lower restricting part 82 includes a recess 821 formed in the lower wall of the rear part 23 and a protrusion 825 formed on the lower wall of the rear part 39. The recess 821 is recessed downward from the upper surface of the lower wall of the rear part 23. The recess 821 is configured as a groove extending substantially from the left edge to the right edge of the lower wall of the rear part 23 in the left-right direction. The recess 821 has a substantially rectangular section and is defined by a front surface, a rear surface and a lower surface. The protrusion 825 protrudes downward from the lower surface of the lower wall of the rear part 39. The protrusion 825 is configured as an elongate protrusion extending in the left-right direction. The protrusion 825 is located in the center portion of the lower wall of the rear part 39 in the left-right direction. The protrusion 825 has a substantially rectangular section and has a front surface, a rear surface and a lower surface. In this embodiment, the lower restricting part 82 is arranged at a different position (specifically, rearward of the upper restricting part 81) from the upper restricting part 81 in the front-rear direction. However, the lower restricting part 82 may be located at substantially the same position as the upper restricting part 81 in the front-rear direction.

The protrusion 825 is disposed within the recess 821. There is a gap between a tip end of the protrusion 825 and the bottom (the lower surface) of the recess 821. The width of the recess 821 in the front-rear direction is larger than the width of the protrusion 825 in the front-rear direction. In the initial state, there is a gap in front of the protrusion 825, and there is another gap behind the protrusion 825. Similar to the upper restricting part 81, the protrusion 825 and the recess 821 abut (come into contact with) each other to thereby restrict (limit) a movable range of the rear part 39 relative to the rear part 23. The dimensions of the gaps between the protrusion 825 and the recess 821 are set similarly to those in the upper restricting part 81.

The left restricting part 83 includes a recess 831 formed in the left wall of the rear part 23 and a protrusion 835 formed on the left wall of the rear part 39. The recess 831 is recessed leftward from the right surface of the left wall of the rear part 23. The recess 831 is configured as a groove extending substantially from the upper edge to the lower edge of the left wall of the rear part 23 in the up-down direction. The recess 831 has a substantially rectangular section and is defined by a front surface, a rear surface and a left surface. The protrusion 835 protrudes leftward from the left surface of the left wall of the rear part 39. The protrusion 835 is configured as an elongate protrusion extending in the up-down direction. The protrusion 835 is located in the center portion in the up-down direction of the left wall of the rear part 39. The protrusion 835 has a substantially rectangular section and has a front surface, a rear surface and a left surface.

The protrusion 835 is arranged within the recess 831. There is a gap between a tip end of the protrusion 835 and the bottom (the left surface) of the recess 831. The width of the recess 831 in the front-rear direction is larger than the width of the protrusion 835 in the front-rear direction. In the initial state, there is a gap in front of the protrusion 835, and there is another gap behind the protrusion 835. Similar to the upper restricting part 81, the protrusion 835 and the recess 831 abut (come into contact with) each other to thereby restrict (limit) a movable range of the rear part 39 relative to the rear part 23. The dimensions of the gaps between the protrusion 835 and the recess 831 are set similarly to those in the upper restricting part 81.

The right restricting part 84 includes a recess 841 formed in the right wall of the rear part 23 and a protrusion 845 formed on the right wall of the rear part 39. The recess 841 is recessed rightward from the left surface of the right wall of the rear part 23. The recess 841 is configured as a groove extending substantially from the upper end to the lower end of the right wall of the rear part 23 in the up-down direction. The recess 841 has a substantially rectangular section and is defined by a front surface, a rear surface and a right surface. The protrusion 845 protrudes rightward from the right surface of the right wall of the rear part 39. The protrusion 845 is configured as an elongate protrusion extending in the up-down direction. The protrusion 845 is located in the center portion in the up-down direction of the right wall of the rear part 39. The protrusion 845 has a substantially rectangular section and has a front surface, a rear surface and a right surface. In this embodiment, the right restricting part 84 is located at substantially the same position as the left restricting part 83 in the front-rear direction. However, the right restricting part 84 may be arranged at the different position (offset) from the left restricting part 83 in the front-rear direction.

The protrusion 845 is arranged within the recess 841. There is a gap between a tip end of the protrusion 845 and the bottom (the right surface) of the recess 841. The width of the recess 841 in the front-rear direction is larger than the width of the protrusion 845 in the front-rear direction. In the initial state, there is a gap in front of the protrusion 845, and there is another gap behind the protrusion 845. Similar to the upper restricting part 81, the protrusion 845 and the recess 841 abut come into contact with) each other to restrict (limit) a movable range of the rear part 39 relative to the rear part 23. The dimensions of the gaps between the protrusion 845 and the recess 841 are set similarly to those in the upper restricting part 81.

Owing to the restricting part 8 having the above-described structures, the movable range of the rear part 39 of the inner housing 3 relative to the outer housing 2 is restricted (limited), compared to the other portion (i.e., the front part 31, the extending part 35 and the elastic connection part 37) on/in which no restricting part is provided. When the oscillating tool 1 is dropped, in at least one of the upper restricting part 81, the lower restricting part 82, the left restricting part 83 and the right restricting part 84, the protrusion partially comes into contact with at least one of the surfaces that define the corresponding recess to thereby restrict (limit) the movement of the inner housing 3 relative to the outer housing 2. This structure (design) can reduce the possibility that the inner housing 3 is moved largely relative to the outer housing 2, due to the inertia.

In particular, in this embodiment, the upper restricting part 81, the lower restricting part 82, the left restricting part 83 and the right restricting part 84 are disposed at four different positions (locations) in the circumferential direction of the outer housing 2 and the inner housing 3. Therefore, compared to a structure in which one restricting part is disposed at only one position (location), the movement of the inner housing 3 relative to the outer housing 2 can be more reliably restricted.

In the oscillating tool 1, the spindle 51, which drives the tool accessory 91 in an oscillating manner, is a major source of vibration. The rear part 39 is a portion of the inner housing 39 that is farthest from the driving axis A1. Therefore, the vibration of the rear part 39 is apt to be larger than the vibration of the other portions (i.e., the front part 31, the extending part 35 and the elastic connection part 37) that are closer to the driving axis A1. Thus, it is rational to restrict (limit) the movement of the inner housing 3 relative to the outer housing 2 at the rear part 39 (i.e. to restrict (limit) relative movement between the rear part 39 and the rear part 23). In this embodiment, the elastic connection part 37 can effectively reduce the vibration to be transmitted from the extending part 35 to the rear part 39. Accordingly, the vibration of the rear part 39 becomes smaller, compared to a structure without the elastic connection part 37. However, it is still rational to dispose the restricting part 8 on/in the rear part 39 and the rear part 23. In this manner, in this embodiment, the restricting part 8 can achieve the vibration-isolating structure that can reduce the impact on the inner housing 3 when the oscillating tool 1 is dropped, while allowing the movement of the inner housing 3 relative to the outer housing 2 during the oscillatory driving of the tool accessory 91.

When the impact is applied to the elastic members 371 of the elastic connection part 37 in the front-rear direction, the elastic members 371 may be more easily damaged, compared to the other portions of the inner housing 3. To cope with this, the restricting part 8 is configured to restrict (limit) the relative movement between the inner housing 3 and the outer housing 2 in the front-rear direction. Therefore, even though the oscillating tool 1 is dropped (falls) and the rear part 39 or the front part 31 hits the ground or floor first, the restricting part 8 can favorably operate, so that the possibility of the damage of the elastic members 371 can be also reduced.

Further, each of the upper restricting part 81, the lower restricting part 82, the left restricting part 83 and the right restricting part 84 is formed by a combination of a recess and a protrusion disposed within the recess. Therefore, when a portion of the protrusion comes into contact with some of the surfaces that define the recess, the rotational (pivotal) movement of the inner housing 3 relative to the outer housing 2 can be restricted, in addition to the forward or rearward linear movement of the inner housing 3 relative to the outer housing 2.

Correspondences between the features of the above-described embodiment and the features of the present disclosure or the present inventions are as follows. The features of the above-described embodiment are merely exemplary, non-limiting examples, and thus do not limit the features of the present invention.

The oscillating tool 1 is an example of a "power tool". The motor 4 is an example of a "motor". The spindle 51 is an example of a "spindle". The tool accessory 91 is an example of a "tool accessory". The inner housing 3 is an example of an "inner housing". The outer housing 3, the upper shell 201 and the lower shell 205 are examples of an "outer housing", an "upper member" and a "lower member", respectively. The lower shell 205 is an example of a "first member". The interposing member 28 is an example of an "interposing member". The front elastic member 71 is an example of an "elastic member". The lower end portion of the interposing member 28 (i.e., the lower end portion 285) is an example of a "first end portion". Each of the first inclined surface 285A and the second inclined surface 285B is an example of a "first surface" and an "inclined surface". The tubular part 283 is an example of a "tubular part". The contact surface 286A is an example of a "second surface".

The above-described embodiment is merely an exemplary example, and a power tool according to the present disclosure is not limited to the oscillating tool 1 of the above-described embodiment. For example, the following modifications may be made. Further, one or more of these modifications may be employed in combination with the oscillating tool 1 of the above-described embodiment or any one of the claimed features.

For example, the following modification(s) may be employed in the structure that elastically connects the front part 21 of the outer housing 2 and the front part 31 of the inner housing 3.

The shapes, material and numbers of the front elastic members 71 may be different from those of the above-described embodiment. For example, the front elastic member 71 may be formed as a tubular body having a through hole or a solid body without a through hole. Further, the section of the front elastic member 71 has a shape other than a circular shape. The front elastic member 71 may be formed of a material that is different from the material of the above-described embodiment. For example, a different kind of synthetic resin (plastic, polymer), rubber or a spring element can be employed. In the above-described embodiment, a pair of the left and right front elastic members 71 is employed. However, multiple pairs of the front elastic members 71 may be employed and disposed between the front part 21 and the rear part 31, such that the multiple pairs are spaced apart from each other in the front-rear direction and/or in the up-down direction.

The shapes, arrangement and numbers of the interposing members 28 may be different from those of the above-described embodiment. For example, the shape of the first portion 281 may be appropriately changed in accordance with the above-described modification of the front elastic members 71. Each of the interposing members 28 may support multiple front elastic members 71. The number of the extending parts 284 and the number of the contact parts 286 of the second portion 282 may be one. The contact surface 286A may be provided on the upper portion of the extending part 284. The interposing members 28 may be respectively disposed between the rear part 23 and a left portion of the rear part 39 and between the rear part 23 and a right portion of the rear part 39 to support the elastic members.

Further, for example, each of the interposing members 28 may be fixed to the upper shell 201 and the lower shell 205 in a state in which the interposing member 28 is inserted into the upper shell 201, such that the interposing member 28 at least partially abuts on (contacts) the inner surface of the upper shell 201. In this modification, inclined (oblique) surfaces that are similar to the first inclined surface 285A and the second inclined surface 285B may be provided on the upper end portion of the interposing member 28 (the upper end portions of each of the extending parts 284). In other words, the inclined surface may be disposed in one of the upper and lower end portions of the interposing member 28 that is inserted into one of the upper shell 201 and the lower shell 205 before the other of the upper and lower end portions. Alternatively, the interposing member 28 may have a symmetric shape in the up-down direction and inclined surfaces may be provided on both the upper and lower end portions of the interposing member 28. Further, each of the interposing members 28 may be fixedly connected to only one of the upper shell 201 and the lower shell 205 into which the interposing member 28 is inserted.

The inclined surface need not include the first inclined surface 285A and the second inclined surface 285B having different angles of inclination. For example, the inclined surface may be a single inclined surface inclined at a constant angle. Alternatively, a curved surface that extends to be closer to the inner housing 3 as the curved surface extends upward or downward (i.e. toward the tip end of the upper end portion or toward the tip end of the lower end portion) may be employed, instead of the flat inclined surface. Further, the inclined surface (flat surface) and the curved surface may be connected to each other in the up-down direction.

Similarly, the structures (the shapes, material and arrangements of the rear elastic members 73) that elastically connect the rear part 23 of the outer housing 2 and the rear part 39 of the inner housing 3 may be appropriately changed.

The shape of the outer housing 2 may be appropriately changed, as long as the outer housing 2 is formed by the upper shell 201 and the lower shell 205 connected together. For example, the switch holder 25 need not be connected to the outer housing 2. Further, the shape and components of each of the metal housing 301 and the plastic housing 305 that form (define) the inner housing 3, and the connection structure between the metal housing 301 and the plastic housing 305 may be appropriately changed. For example, the elastic connection part 37 of the inner housing 3 may be omitted, and the extending part 35 and the rear part 39 may be directly connected.

At least one of the upper restricting part 81, the lower restricting part 82, the left restricting part 83 and the right restricting part 84 may be omitted. Alternatively, a single restricting part extending around the entire circumference of the rear part 39 and the rear part 23 may be employed. Further, the arrangement of the restricting part 8 may be changed. For example, the restricting part 8 may be disposed on a rear end portion of the modified extending part 35 (e.g., the portion of the extending part 35 farthest from the driving axis A1) of the inner housing 3 that does not have the elastic connection member 37. The structure of any one of the upper restricting part 81, the lower restricting part 82, the left restricting part 83 and the right restricting part 84 may be appropriately changed. For example, the arranged positions of the recess and the protrusion may be reversed or the like.

The structures of the mechanisms that are disposed within the housing 10 (e.g., the motor 4, the driving mechanism 5, the clamping mechanism 6 and the control unit 395), the structures of the members supported by the outer housing 2 (e.g., the lever 67 and the connection member 27) and the arrangements thereof may be appropriately changed. For example, the motor 4 may be an AC motor or a brushed motor. Further, the motor 4 may be arranged in the grip part 22 such that the rotational axis A2 of the output shaft 413 is orthogonal to the driving axis A1.

Further, in view of the nature of the present disclosure, the above-described embodiment and the modifications thereof, the following Aspects 1 to 3 can be provided. Any one of the following Aspects 1 to 3 can be employed alone or in combination with any one of the oscillating tools 1 of the above-described embodiment, the above-described modifications and the claimed features.

(Aspect 1)

A pair of recesses is formed on an inner side of each of a left portion and a right portion of the first member, the recesses each extending in the up-down direction, and the interposing members are configured to be fitted into the recesses from below or from above.

(Aspect 2)

The at least one second surface is at least partially located at a position different from the at least one first surface in the up-down direction (Aspect 3)

The at least one second surface is located above a lower end (edge) of the at least one first surface in the up-down direction.

Further, in order to provide advantageous improvements for coping with a drop of a power tool having a vibration-isolating structure, the following Aspects 4 to 20 can be provided. Any one of the following Aspects 4 to 20 can be employed alone or two or more of them can be employed in combination with each other. Alternatively, any one of the following Aspects 4 to 20 can be employed in combination with any one of the oscillating tools 1 of the above-described embodiment, the above-described modifications, the above-described Aspects and the claimed features.

(Aspect 4)

A power tool comprising:
a motor having an output shaft,
a spindle configured to drive a tool accessory removably mounted thereto in an oscillating manner around a first axis, using power generated the motor, the first axis defining an up-down direction of the power tool;
an inner housing that extends along a second axis and that houses at least the motor and the spindle, the second axis being orthogonal to the first axis and defining a front-rear direction of the power tool, the inner housing including a first portion and a second portion that is located farther from the first axis than the first portion;
an outer housing that houses the inner housing;
at least one first elastic member disposed between the inner housing and the outer housing; and
at least one pair of contact parts, each pair including a first contact part provided on/in the second portion of the inner housing and a second contact part provided in/on the outer housing,
wherein the first contact part and the second contact part are configured to come into contact with (abut) each other to thereby restrict (limit) movement of the inner housing relative to the outer housing.

The power tool of this Aspect is a so-called oscillating tool that is configured to drive the tool accessory in an oscillating manner, and includes the inner housing and the outer hosing that are connected via at least one first elastic member such that the inner housing and the outer hosing are movable relative to each other. Owing to this structure, transmission of vibration from the inner housing to the outer housing can be effectively suppressed (reduced). In the power tool of this Aspect, the first contact part and the second contact part come into contact with (abut) each other to thereby restrict (limit) the movement of the inner housing relative to the outer housing. Owing to this structure, even though the power tool is dropped (falls), the possibility (likelihood) can be reduced that the inner housing is moved largely, due to the inertia, relative to the outer housing.

Further, in the oscillating tool, the spindle that drives the tool accessory in an oscillating manner can be a major source of vibration. The vibration of the second portion, which is farther from the first axis of the spindle than the first portion, is apt to be larger than the vibration of the first portion. Thus, it is rational to dispose the first contact part, which is configured to come into contact with the second contact part of the outer housing, on/in the second portion so as to restrict (limit) a movable range of the second portion relative to the outer housing.

(Aspect 5)

The power tool as defined in Aspect 4, wherein the at least one pair of contact parts is configured to restrict at least one of forward movement and rearward movement of the inner housing relative to the outer housing.

According to this Aspect, even though the power tool is dropped (falls) and a rear part or a front part of the power tool hits the ground or floor first, the impact to be applied to the inner housing can be effectively reduced.

(Aspect 6)

The power tool as defined in Aspect 5, wherein the at least one pair of contact parts is configured to restrict both of the forward movement and the rearward movement of the inner housing relative to the outer housing.

According to this Aspect, the impact applied to the inner housing can be effectively reduced, both when the power tool is dropped (falls) and the rear part hits the ground or floor first and when the front part hits the ground or floor first.

(Aspect 7)

The power tool as defined in Aspect 6, wherein:
one of the first contact part and the second contact part includes a recess, and
the other of the first contact part and the second contact part includes a protrusion that protrudes into the recess.

According to this Aspect, when a portion of the protrusion comes into contact with a surface that defines the recess, not only forward and rearward linear movement of the inner housing relative to the outer housing, but also rotational (pivotal) movement of the inner housing relative to the outer housing can be also restricted.

(Aspect 8)

The power tool as defined in any one of Aspects 4 to 7, wherein the at least one pair of contact parts includes (i) multiple pairs of contact parts spaced apart from each other in a circumferential direction around the second axis, or (ii) one pair of contact parts extending along the entire circumference around the second axis.

According to this Aspect, the movement of the inner housing relative to the outer housing can be more reliably restricted, compared to a structure in which only one pair of the contact parts is arranged in a limited portion in the circumferential direction.

(Aspect 9)

The power tool as defined in Aspect 8, wherein:
a direction orthogonal to both of the first axis and the second axis defines a left-right direction of the power tool, and
the first contact parts of the multiple pairs of contact parts are disposed on/in an upper end portion, a lower end portion, a left end portion and a right end portion of the second portion, respectively.

According to this Aspect, the multiple pairs of contact parts are arranged with good balance in the circumferential direction, so that the movement of the inner housing relative to the outer housing can be effectively restricted.

(Aspect 10)

The power tool as defined in any one of Aspects 4 to 9, wherein:
the first portion includes a front part of the inner housing, the front part houses the motor and the spindle, and
the inner housing includes an elastic connection part that elastically connects the front part and the second portion directly or indirectly in the front-rear direction.

According to this Aspect, the elastic connection part can effectively reduce transmission of vibration from the front part of the inner housing to the second portion. Further, the at least one contact part disposed on/in the second portion can reduce the possibility that the elastic connection part is damaged when the power tool is dropped.

(Aspect 11)

The power tool as defined in Aspect 10, wherein the elastic connection part includes a plurality of second elastic members that are spaced apart from each other in a circumferential direction around the second axis.

According to this Aspect, a rational structure of the elastic connection part that is easily elastically deformable can be realized.

(Aspect 12)

The power tool as defined in Aspect 10 or 11, wherein the second portion includes a battery mounting part on/to which a battery is removably mountable.

According to this Aspect, when the battery is mounted on/to the second portion, which is located farther from the first axis than the first portion, the moment of inertia of the inner housing around the first axis can be increased, so that the vibration of the inner housing can be reduced.

(Aspect 13)

The power tool as defined in any one of Aspects 4 to 12, wherein:
the outer housing includes a grip part configured to be held by a user,
the first portion houses the motor and the spindle,
a rotational axis of the output shaft extends in parallel to the first axis, and
a portion of the first portion that houses the motor and the spindle is located frontward of the grip part, and the second portion is located rearward of the grip part.

According to this Aspect, the motor and the spindle can be arranged relatively close to each other, so that the power tool can be downsized. Further, the at least one pair of contact parts can be arranged in the second portion that is relatively far from the spindle and the motor, which are vibration sources.

(Aspect 14)

The recess is an elongate groove extending in a circumferential direction around the second axis, and
the protrusion is an elongate protrusion extending in the circumferential direction.

(Aspect 15)

The recess is defined by at least a front surface and a rear surface that are substantially orthogonal to the second axis, and
the protrusion has at least a front surface and a rear surface that are substantially orthogonal to the second axis.

(Aspect 16)

The second portion is a rear part of the inner housing.

(Aspect 17)

The second portion houses a control unit configured to control driving of the motor.

(Aspect 18)

The first portion includes a front part that houses the motor and the spindle, and an extending part that linearly extends rearward from the front part.

(Aspect 19)

The power tool as defined in Aspect 18, wherein:
the second portion is a rear part of the inner housing, and
the first portion further includes an elastic connection part that elastically connects the extending part and the rear part directly.

(Aspect 20)

A gap between the first contact part and the second contact part allows the movement of the inner housing relative to the outer housing due to the vibration that is generated during oscillatory driving of the tool accessory.

Correspondences between the features of the above-described embodiment and the features of the Aspects 4 to 20 are as follows. The features of the above-described embodiment are merely exemplary, non-limiting examples, and thus do not limit the features of the Aspects 4 to 20.

The oscillating tool 1 is an example of a "power tool". The motor 4 and the output shaft 413 are examples of a "motor" and an "output shaft", respectively. The spindle 51 is an example of a "spindle". The tool accessory 91 is an example of a "tool accessory". The inner housing 3 is an example of an "inner housing". Each of the front part 31, the extending part 35 and the elastic connection part 37 is an example of a "first portion". The rear part 39 is an example of a "second portion". The outer housing 3 is an example of an "outer housing". Each of the front elastic member 71 and the rear elastic member 73 is an example of a "first elastic member". Each of the upper restricting part 81, the lower restricting part 82, the left restricting part 83 and the right restricting part 84 is an example of "a pair of contact parts". Each of the protrusions 815, 825, 835 and 845 is an example of each of a "first contact part" and a "protrusion". Each of the recesses 811, 821, 831 and 841 is an example of each of a "second contact part" and a "recess". The front part 31 is an example of a "front part". The elastic connection part 37 and the elastic member 371 are examples of an "elastic connection part" and a "second elastic member", respectively. The battery mounting part 391 is an example of a "battery mounting part". The grip part 22 is an example of a "grip part". The control unit 395 is an example of a "control unit". The extending part 35 is an example of an "extending part". The rear part 39 and the elastic connection part 37 are examples of a "rear part" and an "elastic connection part", respectively.

The power tool as defined in each of the Aspects 4 to 20 is not limited to the oscillating tool 1 of the above-described embodiment. For example, the following modifications may be made. Further, one or more of these modifications may be employed in combination with at least one of the oscillating tool 1 of the above-described embodiment, the above-described modifications, the above-described Aspects and the claimed features.

For example, the structure for elastically connecting the outer housing 2 and the inner housing 3 may be appropriately changed. Each of the front elastic member 71 and the rear elastic member 73 may be formed of a material (e.g., rubber, a spring element, or a different kind of synthetic resin) that is different from the material of the above-described embodiment. Each of the front elastic member 71 and the rear elastic member 73 may be held between the inner housing 3 and a member that is integrated with (fixed to) the outer housing 2, other than the interposing member 28 and the switch holder 25. Alternatively, the front elastic member 71 and the rear elastic member 73 may abut on (directly contact) the inner housing 3 and the outer housing 2, respectively.

The shape and arrangement of the elastic member arranged between the outer housing 2 and the inner housing 3 may be appropriately changed, as long as the outer housing 2 and the inner housing 3 are elastically connected to be movable relative to each other. The number of the elastic members is not especially limited. However, it may be preferably that multiple elastic members are employed.

The outer housing 2 may be formed by a right shell and a left shell that are connected together, instead of the upper shell 201 and the lower shell 205. The switch holder 25 need not be connected to the outer housing 2. Similarly, the shape and the components of each of the metal housing 301 and the plastic housing 305 that form (define) the inner housing 3, and the connection structure between the metal housing 301 and the plastic housing 305 may be appropriately changed. For example, the elastic connection part 37 of the inner housing 3 may be omitted, and the extending part 35 and the rear part 39 may be directly connected.

The restricting part 8 for restricting the relative movement between the outer housing 2 and the inner housing 3 may employ the following modification(s).

For example, at least one, but not all, of the upper restricting part 81, the lower restricting part 82, the left restricting part 83 and the right restricting part 84 may be omitted. Alternatively, a single restricting part extending along the entire circumference of the rear part 39 and the rear part 23 may be employed. Further, the arrangement of the restricting part 8 may be changed. For example, the restricting part 8 may be disposed on/in the rear end portion of the extending part 35 (i.e., the portion of the extending part 35 that is farthest from the driving axis A1) of the inner housing 3 that does not have the elastic connection member 37.

The structure of the restricting part 8 is not limited to the example of the above-described embodiment. For example, the arranged positions of the recess and the protrusion may be reversed in at least one of the upper restricting part 81, the lower restricting part 82, the left restricting part 83 and the right restricting part 84. For example, a recess may be formed in the upper end portion of the rear part 39 and the protrusion that protrudes into the recess of the inner housing 3 may be formed on the upper end portion of the rear part 23. The shape and dimension of each of the recess and the protrusion may be appropriately changed. At least one pair (two) of protrusions that can contact each other in the front-rear direction may be employed. In this modification, for example, two protrusions may be provided on/in the rear part 39 and the rear part 23, respectively. In this modification, the two protrusions may be configured, for example, to restrict (limit) either one of forward movement and rearward movement of the inner housing 3 relative to the outer housing 3.

The structures of the mechanisms (e.g., the motor 4, the driving mechanism 5, the clamping mechanism 6 and the control unit 395) disposed within the housing 10, the structures of the members supported by the outer housing 2 (for example, the lever 67 and the connection member 27) and the arrangements thereof may be appropriately changed. For example, the motor 4 may be an AC motor or a brushed motor. Further, the motor 4 may be arranged in the grip part 22 such that the rotational axis A2 of the output shaft 413 is orthogonal to the driving axis A1.

Further, in order to provide techniques for rationalizing assembling (mounting, installation) of a driving mechanism in a power tool that drives a tool accessory in an oscillating manner, the following Aspects 21 to 36 can be provided. Any one of the following Aspects 21 to 36 can be employed alone or two or more of them can be employed in combination with each other. Alternatively, any one of the following Aspects 21 to 36 can be employed in combination with any one of the oscillating tools 1 of the above-described embodiment, the above-described modifications, the above-described Aspects and the claimed features.

(Aspect 21)

A power tool comprising:
  a motor having an output shaft that is rotatable around a rotational axis extending in a first direction;
  a spindle configured to removably receive a tool accessory, the spindle being rotatable around a driving axis extending in parallel to the rotational axis of the output shaft;
  an oscillating member operably coupled to the output shaft and the spindle and configured to oscillate around the driving axis in response to rotation of the output shaft to drive the spindle for a pivotal oscillating motion around the driving axis;
  a housing that houses the motor, the spindle and the oscillating member and that has a first opening and a second opening that are respectively located on opposite sides of the oscillating member in a second direction, the second direction being orthogonal to the rotational axis of the output shaft and the driving axis;
  a first cover part that covers the first opening; and
  a second cover part that covers the second opening.

In the housing of the power tool of this Aspect, the first opening and the second opening are disposed on the opposite sides of the oscillating member in the second direction. Thus, an assembler can insert the oscillating member into the housing along the second direction through the first opening or through the second opening. Owing to this design, assembling (mounting, installation) of the oscillating member to the housing can be rationalized. Further, the possibility (likelihood) that foreign matters enter the housing can be reduced by covering the first opening and the second opening using the first cover part and the second cover part.

(Aspect 22)

The power tool as defined in Aspect 21, wherein each of the first cover part and the second cover part is formed of elastic material.

According to this Aspect, the first cover part and the second cover part can more reliably cover the first opening and the second opening, respectively.

(Aspect 23)

The power tool as defined in Aspect 21 or 22, wherein the first cover part and the second cover part are connected with each other to form a single cover member.

According to this Aspect, mounting of the first cover part and the second cover part to the housing can be facilitated, while the number of components is reduced.

(Aspect 24)

The power tool as defined in Aspect 23, wherein the entirety of the single cover member is formed of the same material.

According to this Aspect, the manufacturing cost of the cover member can be reduced.

(Aspect 25)

The power tool as defined in Aspect 23 or 24, wherein:
  the housing includes a housing part for the oscillating member,
  the single cover member has an annular (loop-like) shape and is removably mounted around a periphery of the housing part for the oscillating member,
  the first cover part is biased in a direction to cover the first opening, and
  the second cover part is biased in a direction to cover the second opening.

According to this Aspect, the cover member that can be easily mounted to the housing and that is difficult to come off from the housing can be realized.

(Aspect 26)

The power tool as defined in any one of Aspects 21 to 25, wherein:

the first opening is located on opposite side of the spindle from the output shaft (i.e., the spindle is between the first opening and output shaft) in the second direction, and the length of the first opening in the first direction is larger than the length of the second opening in the first direction.

According to this Aspect, the first opening and the second opening can be formed in dimensions that are suitable for different usage.

(Aspect 27)

The power tool as defined in Aspect 26, wherein the center of the first opening in the first direction is offset in the first direction from the center of the second opening in the first direction.

According to this Aspect, the first opening and the second opening can be formed at positions that are suitable for different usage.

(Aspect 28)

The power tool as defined in any one of Aspects 21 to 27, wherein at least one of the first cover part and the second cover part has a surface that faces an inside of the housing and that has an arc shape protruding outward of the housing.

According to this Aspect, the possibility can be reduced that the first cover part and/or the second cover part interferes with a mechanism disposed within the housing.

(Aspect 29)

At least one of the first opening and the second opening is configured to allow the oscillating member to pass through the least one of the first opening and the second opening.

(Aspect 30)

The housing has a third opening and a fourth opening each opening in the first direction, the rotational axis of the output shaft of the motor extends through the third housing, and the driving axis extends through the fourth opening.

(Aspect 31)

The first direction and the second direction define an up-down direction and a front-rear direction of the power tool, respectively, the housing includes:

a first housing part that houses the spindle and a portion of the oscillating member, a second housing part that is disposed behind the first housing part and that houses the motor, and a third housing part that is disposed behind the first housing part and under the second housing part and that houses a portion of the oscillating member, the first opening is formed in a front wall of the first housing part, and the second opening is formed in a rear wall of the third housing part.

(Aspect 32)

The power tool further comprises two bearings that are held by the housing at positions spaced apart from each other in the first direction, the two bearings rotatably supporting the spindle, and the first opening is formed in a region of the housing between the two bearings in the first direction.

(Aspect 33)

The power tool further comprises:

an eccentric shaft that is connected coaxially to the output shaft and that has an eccentric part; and a driving bearing that is mounted around an outer periphery of the eccentric part and that is operably coupled to the oscillating member, and the second opening is disposed in a region of the housing that corresponds to at least a portion of the eccentric shaft in the first direction.

(Aspect 34)

The oscillating member has a first end portion fixed to the spindle and a bifurcated second end portion abutting on an outer peripheral surface of the driving bearing, and the dimension of the first end portion in the first direction is larger than the dimension of the second end portion in the first direction.

(Aspect 35)

The first end portion of the oscillating member abuts on a first bearing that is closer to the tool accessory among the two bearings.

(Aspect 36)

The housing includes a housing part for the oscillating member, and the single cover member is formed in an annular shape and is removably mounted around the housing part for the oscillating member.

Correspondences between the features of the above-described embodiment and the features of the Aspects 21 to 36 are as follows. The features of the above-described embodiment are merely exemplary, non-limiting examples, and thus do not limit the features of the Aspects 21 to 36.

The oscillating tool 1 is an example of a "power tool". The motor 4 and the output shaft 413 are examples of a "motor" and an "output shaft", respectively. The spindle 51 is an example of a "spindle". The oscillating member 536 is an example of an "oscillating member". The housing 10 (the inner housing 3) is an example of a "housing". The front opening 323 and the rear opening 324 are examples of a "first opening" and a "second opening", respectively. The front cover part 333 and the rear cover part 334 are examples of a "first cover part" and a "second cover part", respectively. The cover member 33 is an example of a "cover member". The upper end (open top) of the second housing part 312 and the lower end (open bottom) of the first housing part 311 are examples of a "third opening" and a "fourth opening", respectively. The first housing part 311, the second housing part 312 and the third housing part 313 are examples of the "first housing part", the "second housing part" and the "third housing part", respectively. The bearings 513, 514 are an example of the "two bearings". The eccentric shaft 531 and the driving bearing 534 are examples of an "eccentric shaft" and a "driving bearing", respectively. The first end portion 537 and the second end portion 538 are examples of a "first end portion" and a "second end portion", respectively. The bearing 514 is an example of a "first bearing".

The power tool as defined in each of the Aspects 21 to 36 is not limited to the oscillating tool 1 of the above-described embodiment. For example, the following modifications may be made. Further, one or more of these modifications may be employed in combination with at least one of the oscillating tool 1 of the above-described embodiment, the above-described modifications, the above-described Aspects and the claimed features.

The structure for elastically connecting the outer housing 2 and the inner housing 3 may be appropriately changed. Each of the front elastic member 71 and the rear elastic member 73 may be formed of a material (for example, rubber, a spring element, or a different kind of synthetic resin) that is different from the material of the above-described embodiment. The number, shape and arrangement of each of the front elastic members 71 and the rear elastic members 73 may be appropriately changed. Each of the front elastic member 71 and the rear elastic member 73 may be held between the inner housing 3 and a member that is integrated with the outer housing 2, other than the interposing member 28 and the switch holder 25. Alternatively, the front elastic member 71 and the rear elastic member 73 may directly abut on the inner housing 3 and the outer housing 2, respectively.

At least one of the upper restricting part 81, the lower restricting part 82, the left restricting part 83 and the right restricting part 84 may be omitted. Alternatively, a single restricting part extending around the entire circumference of the rear part 39 and the rear part 23 may be employed. Further, the arrangement of the restricting part 8 may be changed. For example, the restricting part 8 may be disposed on/in the rear end portion of the extending part 35 (i.e., the portion of the extending part 35 that is farthest from the driving axis A1) of the inner housing 3 that does not have the elastic connection member 37. The structure of each of the upper restricting part 81, the lower restricting part 82, the left restricting part 83 and the right restricting part 84 may be appropriately changed. For example, the arranged positions of the recess and the protrusion may be reversed or the like.

The outer housing 2 may be formed by, for example, a right shell and a left shell that are connected together, instead of the upper shell 201 and the lower shell 205. The switch holder 25 need not be connected to the outer housing 2. Similarly, the shape and the components of each of the metal housing 301 and the plastic housing 305 that form (define) the inner housing 3, and the connection structure between the metal housing 301 and the plastic housing 305 may be appropriately changed. For example, the elastic connection part 37 of the inner housing 3 may be omitted, and the extending part 35 and the rear part 39 may be connected directly.

Further, the housing 10 need not have the vibration-isolating structure of the above-described embodiment. For example, the housing 10 may have a single-layered structure. Alternatively, the housing 10 may have a structure in which the inner housing is fixedly arranged in the outer housing.

The shape, length and arrangement of each of the front opening 323 and the rear opening 324 may be appropriately changed, in response to or regardless of the structure and the arrangement of the oscillating member 536. For example, the lengths and positions of the front opening 323 and the rear opening 324 in the up-down direction may be the same. In response to this modification, the structure and position of each of the front cover part 333 and the rear cover part 334 of the cover member 33 may be changed.

The front cover part 333 and the rear cover part 334 need not be connected to each other. In other words, the front cover part 333 and the rear cover part 334 may be separate (individual, discrete) members. Alternatively, the front cover part 333 and the rear cover part 334 may be connected to opposite ends of a band-shaped (strip-shaped) member, respectively. The front cover part 333 and the rear cover part 334 may be respectively formed of elastic materials different from each other, or a material that is not an elastic material.

The structures of the mechanisms (e.g., the motor 4, the driving mechanism 5, the clamping mechanism 6 and the control unit 395) disposed within the housing 10 and the structures of the members supported by the outer housing 2 (e.g., the lever 67 and the connection member 27) and the arrangements thereof may be appropriately changed. For example, the motor 4 may be an AC motor or a brushed motor. Further, the motor 4 may be arranged in the grip part 22 such that the rotational axis A2 of the output shaft 413 orthogonal to the driving axis A1.

DESCRIPTION OF THE REFERENCE NUMERALS

1: oscillating tool, 10: housing, 2: outer housing, 201: upper shell, 205: lower shell, 206: recess, 207: rib, 21: front part, 211: upper wall, 212: support hole, 213: spring housing part, 214: release recess, 215: opening, 22: central part (grip part), 23: rear part, 25: switch holder, 251: body, 252: recess, 254: tubular part, 258: flat spring, 259: protrusion, 26: switch unit, 261: first switch, 262: second switch, 263: plunger, 265: switch lever, 266: pressing piece, 27: connection member, 275: operation part, 28: interposing member, 281: first portion, 281A: pressing surface, 282: second portion, 283: tubular part, 284: extending part, 285: lower end portion, 285A: first inclined surface, 285B: second inclined surface, 286: contact part, 286A: contact surface, 29: screw, 3: inner housing, 301: metal housing, 305: plastic housing, 306: right shell, 307: left shell, 31: front part, 311: first housing part, 312: second housing part, 313: third housing part, 314: cover part, 317: recess, 323: front opening, 324: rear opening, 33: cover member, 331: annular part, 333: front cover part, 334: rear cover part, 35: extending part, 351: outer extending part, 353: inner extending part, 37: elastic connection part, 371: elastic member, 39: rear part, 391: battery mounting part, 392: control-unit housing part, 393: arm, 395: control unit, 4: motor, 413: output shaft, 45: fan, 5: driving mechanism, 6: clamping mechanism, 8: restricting part, 51: spindle, 511: tool mounting part, 513: bearing, 514: bearing, 53: transmitting mechanism, 531: eccentric shaft, 534: driving bearing, 536: oscillating member, 537: first end portion, 538: second end portion, 61: clamping shaft, 67: lever, 671: body part, 672: manipulation part, 673: engagement protrusion, 674: actuation part, 675: actuating protrusion, 676: locking recess, 677: protrusion, 678: protrusion, 679: screw, 68: coil spring, 681: first end, 683: second end, 71: front elastic member, 73: rear elastic member, 81: upper restricting part, 811: recess, 815: protrusion, 82: lower restricting part, 821: recess, 825: protrusion, 83: left restricting part, 831: recess, 835: protrusion, 84: right restricting part, 841: recess, 845: protrusion, 91: tool accessory, 93: battery, A1: driving axis, A2: rotational axis, P: plane

What is claimed is:
1. A power tool comprising:
a motor having an output shaft;
a spindle configured to drive a tool accessory removably mounted thereto in an oscillating manner around a first axis, using power generated the motor, the first axis defining an up-down direction of the power tool;
an inner housing that extends along a second axis and that houses at least the motor and the spindle, the second axis being orthogonal to the first axis and defining a front-rear direction of the power tool, the inner housing including a first portion and a second portion that is located farther from the first axis than the first portion;
an outer housing that houses the inner housing;
at least one first elastic member disposed between the inner housing and the outer housing; and at least one pair of contact parts, each pair including a first contact part provided on or in the second portion of the inner housing and a second contact part provided in or on the outer housing, wherein the first contact part and the second contact part are configured to come into contact with each other to thereby restrict movement of the inner housing relative to the outer housing, and wherein no structure is disposed between the first contact part and the second contact part.

2. The power tool as defined in claim 1, wherein the at least one pair of contact parts is configured to restrict at least one of (i) forward movement of the inner housing relative to the outer housing and (ii) rearward movement of the inner housing relative to the outer housing.

3. The power tool as defined in claim 2, wherein the at least one pair of contact parts is configured to restrict both of (i) the forward movement of the inner housing relative to the outer housing and (ii) the rearward movement of the inner housing relative to the outer housing.

4. The power tool as defined in claim 3, wherein:
a first one of the first contact part and the second contact part includes a recess, and
a second one of the first contact part and the second contact part includes a protrusion that protrudes into the recess.

5. The power tool as defined in claim 1, wherein the at least one pair of contact parts includes multiple pairs of contact parts spaced apart from each other in a circumferential direction around the second axis.

6. The power tool as defined in claim 5, wherein:
a direction orthogonal to both of the first axis and the second axis defines a left-right direction of the power tool, and
the first contact parts of the multiple pairs of contact parts are disposed on or in an upper end portion, a lower end portion, a left end portion and a right end portion of the second portion, respectively.

7. The power tool as defined in claim 1, wherein:
the first portion includes a front part of the inner housing,
the front part houses the motor and the spindle, and
the inner housing includes an elastic connection part that elastically connects the front part and the second portion directly or indirectly in the front-rear direction.

8. The power tool as defined in claim 7, wherein:
the first portion includes an extending part that linearly extends rearward from the front part,
the second portion is a rear part of the inner housing, and
the elastic connection part elastically connects the extending part and the rear part.

9. The power tool as defined in claim 7, wherein the elastic connection part includes a plurality of second elastic members that are spaced apart from each other in a circumferential direction around the second axis.

10. The power tool as defined in claim 7, wherein the second portion includes a battery mounting part that is configured to removably receive a battery.

11. The power tool as defined in claim 1, wherein:
the outer housing includes a grip part configured to be held by a user,
the first portion houses the motor and the spindle,
a rotational axis of the output shaft extends in parallel to the first axis, and
a portion of the first portion that houses the motor and the spindle is located frontward of the grip part, and the second portion is located rearward of the grip part.

12. The power tool as defined in claim 1, wherein:
a first one of the first contact part and the second contact part is an elongate groove extending in a circumferential direction around the second axis,
a second one of the first contact part and the second contact part is an elongate protrusion extending in the circumferential direction,
the groove is defined by at least a front surface and a rear surface that are substantially orthogonal to the second axis, and
the protrusion (i) has at least a front surface and a rear surface that are substantially orthogonal to the second axis and (ii) is movable in the front-rear direction within the groove.

13. The power tool as defined in claim 12, wherein:
a direction orthogonal to both of the first axis and the second axis defines a left-right direction of the power tool,
the at least one pair of contact parts includes multiple pairs of contact parts, and
the first contact parts of the multiple pairs of contact parts are respectively disposed on or in at least two selected from a group consisting of an upper end portion, a lower end portion, a left end portion and a right end portion of the second portion.

14. The power tool as defined in claim 13, wherein:
the first portion includes (i) a front part that houses the motor and the spindle, and (ii) an extending part that linearly extends rearward from the front part,
the second portion is a rear part of the inner housing and has a battery mounting part that is configured to removably receive a battery, and
the inner housing includes an elastic connection part that elastically connects the extending part and the rear part in the front-rear direction.

15. The power tool as defined in claim 14, wherein:
the outer housing includes a grip part configured to be held by a user,
a rotational axis of the output shaft extends in parallel to the first axis, and
the front part is located frontward of the grip part, and the rear part is located rearward of the grip part.

16. The power tool as defined in claim 1, wherein:
in an initial state in which the outer housing and the inner housing are not moving relative to each other, the first contact part and the second contact part are separated from each other.

17. The power tool as defined in claim 6, wherein:
the first contact part disposed on or in the upper end portion of the second portion extends from a left edge to a right edge of a top edge of the second portion in the left-right direction,
the first contact part disposed on or in the lower end portion of the second portion extends from a left edge to a right edge of a lower edge of the second portion in the left-right direction,
the first contact part disposed on or in the left end portion of the second portion extends from an upper edge to a lower edge of a left edge of the second portion in the up-down direction, and
the first contact part disposed on or in the right end portion of the second portion extends from an upper edge to a lower edge of a right edge of the second portion in the up-down direction.

18. A power tool comprising:
a motor having an output shaft;
a spindle configured to drive a tool accessory removably mounted thereto in an oscillating manner around a first axis, using power generated the motor, the first axis defining an up-down direction of the power tool;

an inner housing that extends along a second axis and that houses at least the motor and the spindle, the second axis being orthogonal to the first axis and defining a front-rear direction of the power tool, the inner housing including a first portion and a second portion that is located farther from the first axis than the first portion;

an outer housing that houses the inner housing;

at least one first elastic member disposed between the inner housing and the outer housing; and at least one pair of contact parts, each pair including a first contact part provided on or in the second portion of the inner housing and a second contact part provided in or on the outer housing, wherein the first contact part and the second contact part are configured to come into contact with each other to thereby restrict movement of the inner housing relative to the outer housing, wherein the at least one first elastic member is not disposed between the first contact part and the second contact part, wherein the at least one pair of contact parts is configured to restrict both of (i) a forward movement of the inner housing relative to the outer housing and (ii) a rearward movement of the inner housing relative to the outer housing, wherein a first one of the first contact part and the second contact part includes a recess, wherein a second one of the first contact part and the second contact part includes a protrusion that protrudes into the recess, and wherein a front side surface of the protrusion is configured to contact a front inner surface of the recess when the protrusion moves frontward relative to the recess, and a rear side surface of the protrusion is configured to contact a rear inner surface of the recess when the protrusion moves rearward relative to the recess.

\* \* \* \* \*